United States Patent [19]

Marker, Jr.

[11] Patent Number: 4,802,220
[45] Date of Patent: Jan. 31, 1989

[54] METHOD AND APPARATUS FOR MULTI-CHANNEL COMMUNICATION SECURITY

[75] Inventor: Walter S. Marker, Jr., Warrenville, Ill.

[73] Assignee: American Telephone and Telegraph Company, AT&T Bell Laboratories, Murray Hill, N.J.

[21] Appl. No.: 714,192

[22] Filed: Mar. 20, 1985

[51] Int. Cl.[4] .......................... H04K 1/10; H04L 9/00
[52] U.S. Cl. ......................................... 380/33; 380/49
[58] Field of Search .................. 455/27; 375/2.1, 2.2;
370/69.1, 60, 94; 179/1.5 R, 1.5 S; 380/21, 31,
44, 28, 33, 43, 48, 23-25, 34, 49

[56] References Cited

U.S. PATENT DOCUMENTS

| | | | |
|---|---|---|---|
| 1,395,378 | 11/1921 | Wilson et al. | 455/27 |
| 1,542,567 | 6/1925 | Mathes | 380/34 |
| 1,558,535 | 10/1925 | Delany | 455/27 |
| 1,565,521 | 12/1925 | Stone et al. | 380/34 |
| 1,596,251 | 8/1926 | Hammond, Jr. | 380/34 |
| 1,869,659 | 8/1932 | Broertjes | 380/34 |
| 1,875,165 | 8/1932 | Schröter | 380/34 X |
| 2,094,132 | 9/1937 | Miller | 380/33 |
| 3,411,089 | 11/1968 | Gicca | 375/2.1 |
| 3,921,151 | 11/1975 | Guanella | 178/22.04 |
| 3,953,677 | 4/1976 | Gannett | 179/1.5 |
| 4,004,089 | 1/1977 | Richard et al. | 178/22.04 |
| 4,100,374 | 7/1978 | Jayant et al. | 179/1.5 |
| 4,172,213 | 10/1979 | Barnes et al. | 178/22 |
| 4,172,968 | 10/1979 | Steinberg et al. | 179/1.5 |
| 4,182,933 | 1/1980 | Rosenblum | 179/1.5 R |
| 4,200,770 | 4/1980 | Hellman et al. | 178/22 |
| 4,223,182 | 9/1980 | Fraser | 178/22.04 |
| 4,275,265 | 6/1981 | Davida et al. | 178/22 |
| 4,283,599 | 8/1981 | Atalla | 178/22 |
| 4,319,079 | 3/1982 | Best | 178/22 |
| 4,322,577 | 3/1982 | Brandstrom | 178/22 |
| 4,341,925 | 7/1982 | Doland | 178/22 |
| 4,349,695 | 9/1982 | Morgan et al. | 178/22 |
| 4,357,529 | 11/1982 | Atalla | 235/380 |
| 4,393,269 | 7/1983 | Konheim et al. | 178/22 |
| 4,399,323 | 8/1983 | Henry | 178/22 |
| 4,411,017 | 10/1983 | Talbot | 380/31 |
| 4,418,425 | 11/1983 | Fennel, Jr. et al. | 455/27 |
| 4,423,287 | 12/1983 | Zeidler | 178/22 |
| 4,433,211 | 2/1984 | McCalmont et al. | 179/1.5 X |
| 4,525,844 | 6/1985 | Scheuermann | 375/2.1 |
| 4,534,037 | 8/1985 | Heitmann | 178/22.04 |
| 4,549,308 | 10/1985 | Lo Pinto | 380/21 |
| 4,578,530 | 3/1986 | Zeidler | 380/24 |

Primary Examiner—Salvatore Cangialosi
Assistant Examiner—Bernarr Earl Gregory
Attorney, Agent, or Firm—Ross T. Watland

[57] ABSTRACT

A multi-channel communication security system where the information in an original information message is split among a number of channels in accordance with a message splitting routine such that the interception and analysis of any single channel does not compromise the privacy of the communication. The system provides secure communication terminal adapters in cojunction with user terminals for splitting and recombining of private communications together with control facilities in an integrated services digital network (ISDN) for selecting amoung a multiplicity of possible of message splitting routines and generating security code signals for transmission in separate D-channels to the user equipment.

34 Claims, 14 Drawing Sheets

METHOD AND APPARATUS FOR MULTI-CHANNEL COMMUNICATION SECURITY

TECHNICAL FIELD

This invention relates to methods and systems for providing secure communications and particularly to message splitting and multi-channel transmission of separate message portions. The invention specifically pertains to security equipment for terminal end user stations and to control equipment for defining message splitting routines in an integrated services digital network (ISDN) which advantageously provides multi-channel digital connectivity between network terminal end users. The security and control equipment provide for encryption and recombination of information messages communicated in split portions over distinct communication channels.

BACKGROUND OF THE INVENTION

Privacy systems are in use both in telephone and other types of communication systems. Such privacy systems render signals unintelligible to avoid interception by unauthorized listeners and, in many cases, are restricted to selected communication channels over which secret messages are sent. However, security arrangements are also frequently appropriate when messages are transmitted over common communication paths easily accessible to third parties, e.g., the microwave links in a long-distance telephone network or the time-multiplexed lines of a time division system.

One known privacy communication arrangement, disclosed in U.S. Pat. No. 4,100,374 of N. S. Jayant et produce an uncorrelated scrambled signal. The process involves sampling the information signal at a predetermined rate and dividing the samples into groups of N successive samples. To encrypt the signal, each successive sample group is permuted by transposing the samples within the group. The Jayant et al. system is, however, vulnerable to a "code-breaking" process whereby the scrambled signal is recorded and then analyzed by a computer to determine the scrambling technique involved. The original information signal is then recreated by performing the inverse of the determined technique on the recorded signal, thus effectively "code-breaking" the system.

A recognized problem in the art is the vulnerability of known privacy systems including the Jayant et al. system, to "code-breaking", particularly where all the information in the original signal is present in the encrypted signal and where the encrypted signal as in the Jayant et al. system, can be recorded by unauthorized listeners and subjected to an exhaustive analysis by computer to defeat the encryption.

SUMMARY OF THE INVENTION

The aforementioned problem is solved and a technical advance is achieved in accordance with the principles of the invention in a multi-channel secure communication system where the information in the original message is split advantageously among a number of channels in accordance with a selected message splitting routine such that the interception and analysis of any single channel will not compromise the privacy of the communication. The invention has particular applicability in conjunction with integrated services digital networks (ISDN's) which will typically provide each user with end-to-end digital connectivity via a multi-channel network.

In an illustrative arrangement in accordance with the invention, secure communication terminal adapters are provided in conjunction with user terminal equipment to effect the message splitting and recombining functions. The adapters include transmit and receive units for bidirectional communication, as well a processor that controls the security functions of the transmit and receive units in accordance with routines stored in an associated memory. A transmit unit responds to a first security code signal defining a message splitting routine, by splitting an information message into first portions and second portions. The transmit unit transmits such first portions and second portions, respectively, on first and second communication channels to a receive unit in an adapter at the terminating user terminal equipment. The terminating receive unit responds to a second security code signal and to a receipt of the first and second portions from the communication channels, by reforming the information message in accordance with a combining routine.

The two communication channels are, by way of example, circuit-switched channels completed through an integrated services digital network (ISDN) that provides multi-channel digital connectivity between user stations. That network illustratively includes originating and terminating central offices directly interconnected via bidirectional digital transmission facilities. Advantageously, the first and second channels are extendible through the network on physically separate paths, e.g., on separate digital facilities along different routes. The terminating central office selects one of a number of possible splitting routines for splitting individual messages among multiple channels. Security code signals defining the selected splitting routine are then transmitted advantageously from the network via a separate D-channel to both the originating and terminating user stations. The transmit unit in the originating user station responds to a security code signal by splitting a given message into first portions and second portions in accordance with the defined splitting routine. The first portions and second portions are communicated over the first and second channels, respectively, to the receive unit in the terminating user station. Such receive unit responds to a security code signal by combining received first portions and received second portions in accordance with a combining routine associated with the defined splitting routine, thus reforming the given message.

The security afforded by this invention is greatly enhanced because of the multiplicity of ways of splitting even relatively short messages. By way of example, the message portions each are individual bits of the message. The message splitting is advantageously effected in accordance with a splitting routine that is selected for each secure communication from a large number of possible splitting routines. One such splitting routine illustratively effects a transmission of first, third, fifth and seventh bits of an eight-bit message over the first channel, and the second, fourth, sixth and eighth message bits over the second channel. Another such splitting routine, by way of example, controls a transmission of the first, fourth, fifth and seventh bits of an eight-bit message over the first channel, and the second, third, sixth and eighth bits over the second channel. A large number of different splitting routines are possible even for the relatively simple case of an eight-bit message being split between two channels. As an additional security measure, the transmissions over the first and second channels are separately encrypted using a random number addition method and apparatus embodied in the terminal adapter.

The invention provides for alternatives to the circuit-switched channel arrangements by message splitting among a number of logical channels in a single packet-switched D-channel, or significantly among successive packets in a single logical channel.

BRIEF DESCRIPTION OF THE DRAWING

A more complete understanding of the present invention may be obtained from a consideration of the following description when read in conjunction with the drawing in which.

General Description

Figure 1:
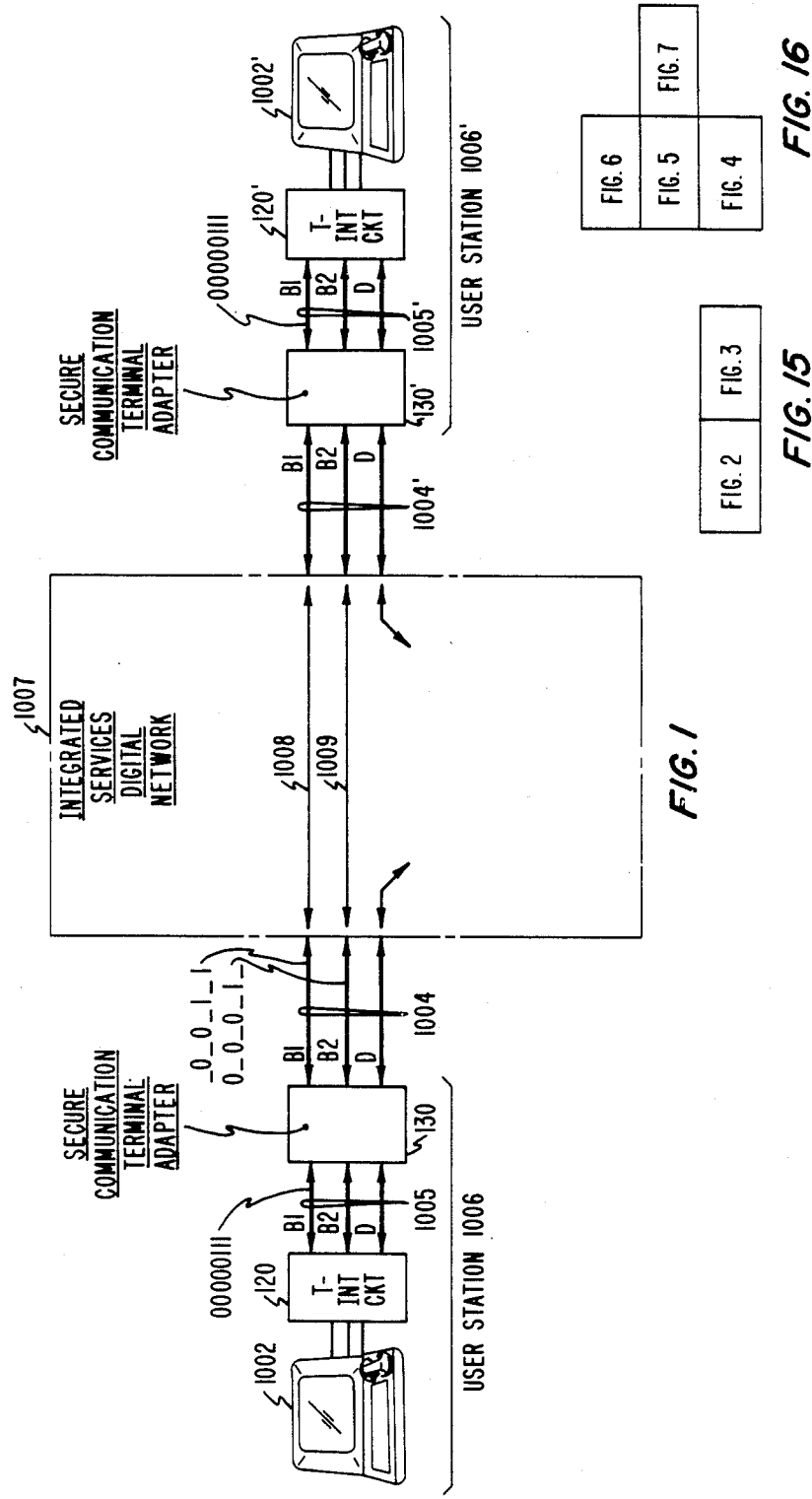
FIG. 1 is a generalized diagram of an exemplary security arrangement used to illustrate the advantageous splitting of messages among channels in an ISDN system.

FIG. 1 is a generalized diagram of an exemplary security arrangement used to illustrate the important principles of the present invention. The arrangement of FIG. 1 includes two user stations 1006 and 1006' both of which are connected to an integrated services digital network (ISDN) 1007. An integrated services digital network is defined as a network evolved from the telephony integrated digital network that provides end-to-end digital connectivity to support a wide range of services, including voice and non-voice services, to which users have access by a limited set of standard multipurpose customer interfaces. Network 1007 will typically include common communication paths that are easily accessible to third parties, e.g., the microwave links in a long-distance telephone network or the time-multiplexed lines of time division systems. In the arrangement of FIG. 1, each user station includes a user terminal, an interface circuit referred to as a T-interface circuit and defined later herein, and a secure communicaton terminal adapter. For example, user station 1006 includes user terminal 1002, T-interface circuit 120 and secure communication terminal adapter 130 and user station 1006' includes user terminal 1002', T-interface circuit 120' and secure communication terminal adapter 130'. The user stations 1006 and 1006' are coupled to network 1007 via user access lines 1004 and 1004'. Each user access line, e.g., 1004, is a four-wire line with a serial bit stream being transmitted from user station 1006 to network 1007 using one pair of wires and a serial bit stream being transmitted from network 1007 to user station 1006 using the other pair of wires. User access line 1004 has two 64 kilobits per second B-channels B1 and B2 and a 16 kilobits per second D-channel defined thereon (the channels B1, B2 and D of user access line 1004 are shown in FIG. 1). Signaling information is conveyed between user station 1006 and network 1007 via the D-channel of access line 1004. The B-channels B1 and B2 are circuit-switched by network 1007 to corresponding channels of, in general, different destination user stations. However, when used for secure communication in accordance with the invention, both B-channels are circuit switched to the same destination user station. To initiate secure communication with user station 1006', user station 1006 transmits a call request in the D-channel of access line 1004 to network 1007 defining a secure call to user station 1006'. Network 1007 responds to the call request by establishing connections 1008 and 1009 between the channels B1 and B2 of access line 1004 and the corresponding channels B1 and B2 of access line 1004' to user station 1006'. Advantageously, connections 1008 and 1009 may be established along physically separate paths. Once the connections 1008 and 1009 have been completed, user stations 1006 and 1006' have two communication channels contemporaneously available for inter-station communication. Consider for example that an information message is originally transmitted from user terminal 1002 in its channel B1. The channel B1 is conveyed via T-interface circuit 120 to secure communication terminal adapter 130 which splits the message into first portions and second portions. Terminal adapter 130 transmits the first portions on the channel B1 of access line 1004 to network 1007 and transmits the second portions on the channel B2 of access line 1004. Terminal adapter 130 also separately encrypts the first portions and the second portions. The first portions are transmitted via connection 1008 to the channel B1 of access line 1004' to user station 1006' and the second portions are transmitted via connection 1009 to the channel B2 of access line 1004'. Secure communication terminal adapter 130' receives the two channels B1 and B2 from access line 1004', separately decrypts the first portions received thereon, and combines the first portions and second portions to reform the original message. Terminal adapter 130' then transmits the message via T-interface circuit 120' in the channel B1 to user terminal 1002'.

The splitting of messages into first portions and second portions is illustrated in FIG. 1 for a particular splitting routine. An original message 00000111 is transmitted from user terminal 1002 in the channel B1 and is split into first portions and second portions each comprising individual bits. The temporal order of transmission of the bits of the message 00000111 is that three consecutive "1"s are first transmitted followed by five consecutive "0"s. The first portions comprising the first, third, fifth and seventh bits of the original message are transmitted from terminal adapter 130 in the channel B1 of user access line 1004, via connection 1008 of network 1007 and the channel B1 of user access line 1004' to terminal adapter 130'. The second portions comprising the second, fourth, sixth and eighth bits are transmitted from terminal adapter 130 in the channel B2 of user access line 1004, via connection 1009 of network 1007 and the channel B2 of user access 1004' to terminal adapter 130'. Terminal adapter 130' combines the received first portions and the received second portions to reform the original message 00000111. For clarity, the separate encryption of the first portions and the second portions is not shown in FIG. 1.

Advantageously, any one of a number of potential splitting routines may be used by terminal adapter 130 for splitting the message among the channels B1 and B2. Network 1007 selects the splitting routine to be used for a particular secure call and informs both user station 1006 and user station 1006' of the selected routine by transmitting security code signals on the D-channels of access line 1004 and access line 1004', respectively. Such information defining the selected splitting routine is itself communicated in a secure manner using indirect references as described later herein. Terminal adapter 130 thereafter splits the message into first portions and second portions in accordance with the selected splitting routine and terminal adapter 130' combines received first portions and received second portions in accordance with a combining routine that is the inverse of the selected splitting routine.

In a first alternative embodiment described herein, the message, rather than being split among the two circuit-switched B-channels, is instead split among two logical channels on the packet-switched D-channel. In a second alternative embodiment also described herein, the message is split among consecutive packets in a single logical channel on the packet-switched D-channel.

It should be noted that the use of the network 1007 in the arrangement of FIG. 1 is itself only an example. User stations 1006 and 1006' could instead be connected by any of a number of multi-channel networks, for example separate circuit-switched or packet-switched networks. Further, although the secure communication terminal adapter 130 is shown in FIG. 1 as being part of user station 1006, the functions of adapter 130 could be performed elsewhere—for example, at a separate location near user terminal 1002 or within network 1007.

DETAILED DESCRIPTION

Figure 2:
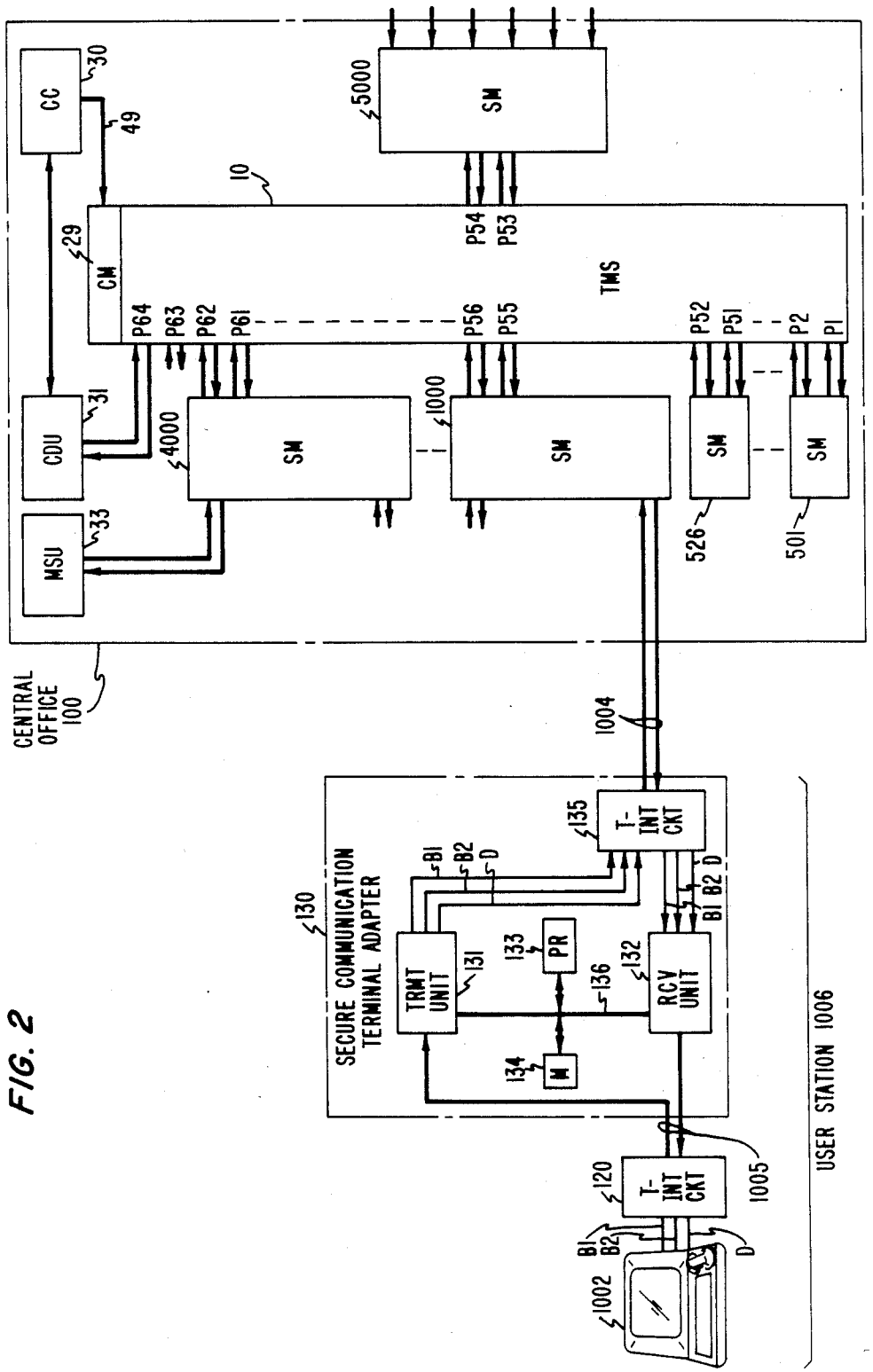
FIGS. 2 and 3, when arranged in accordance with FIG. 15, present a more specific diagram of an exemplary multi-channel security arrangement of the type shown more generally in FIG. 1.
Figure 3:
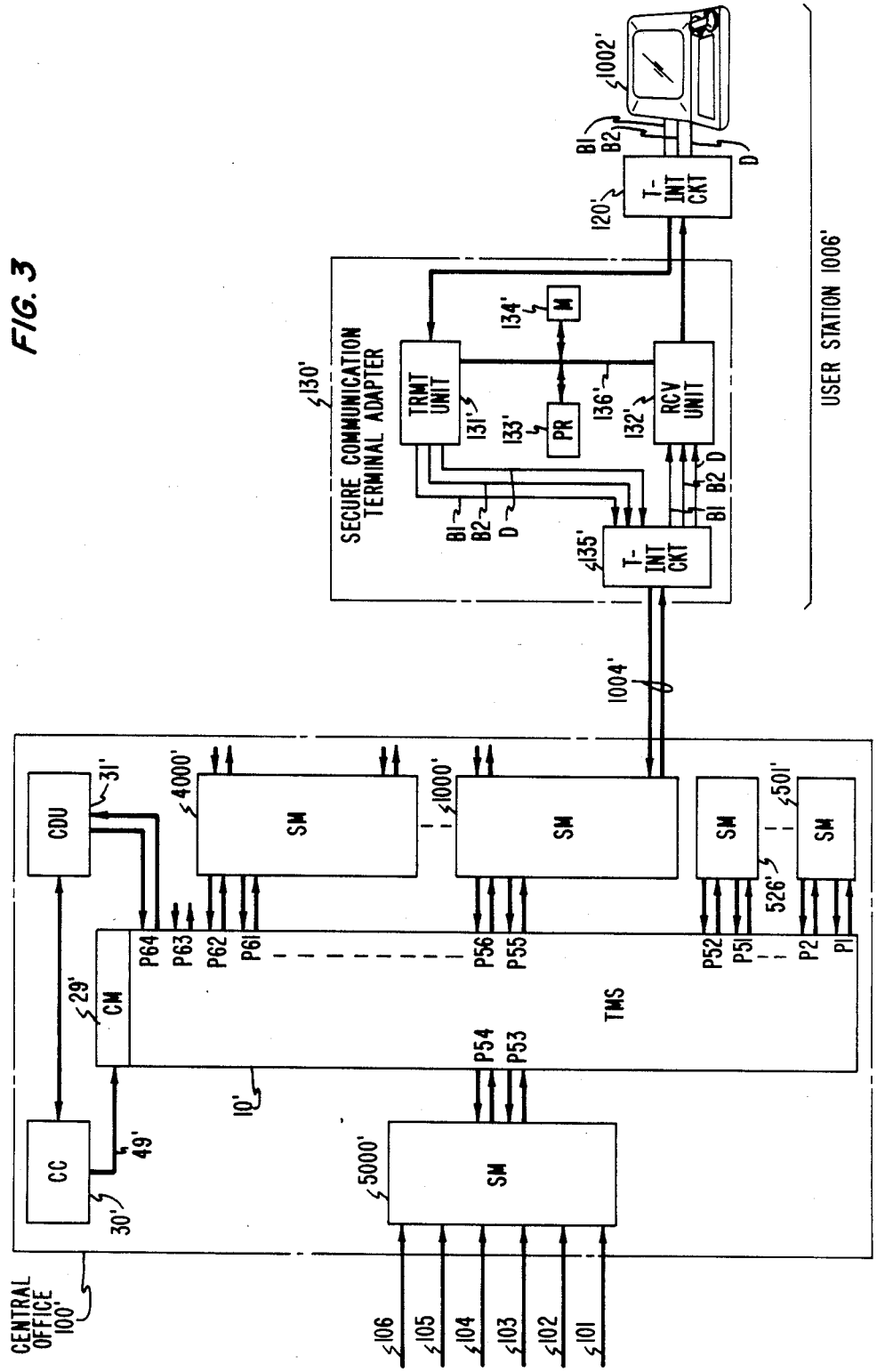
Figure 4:
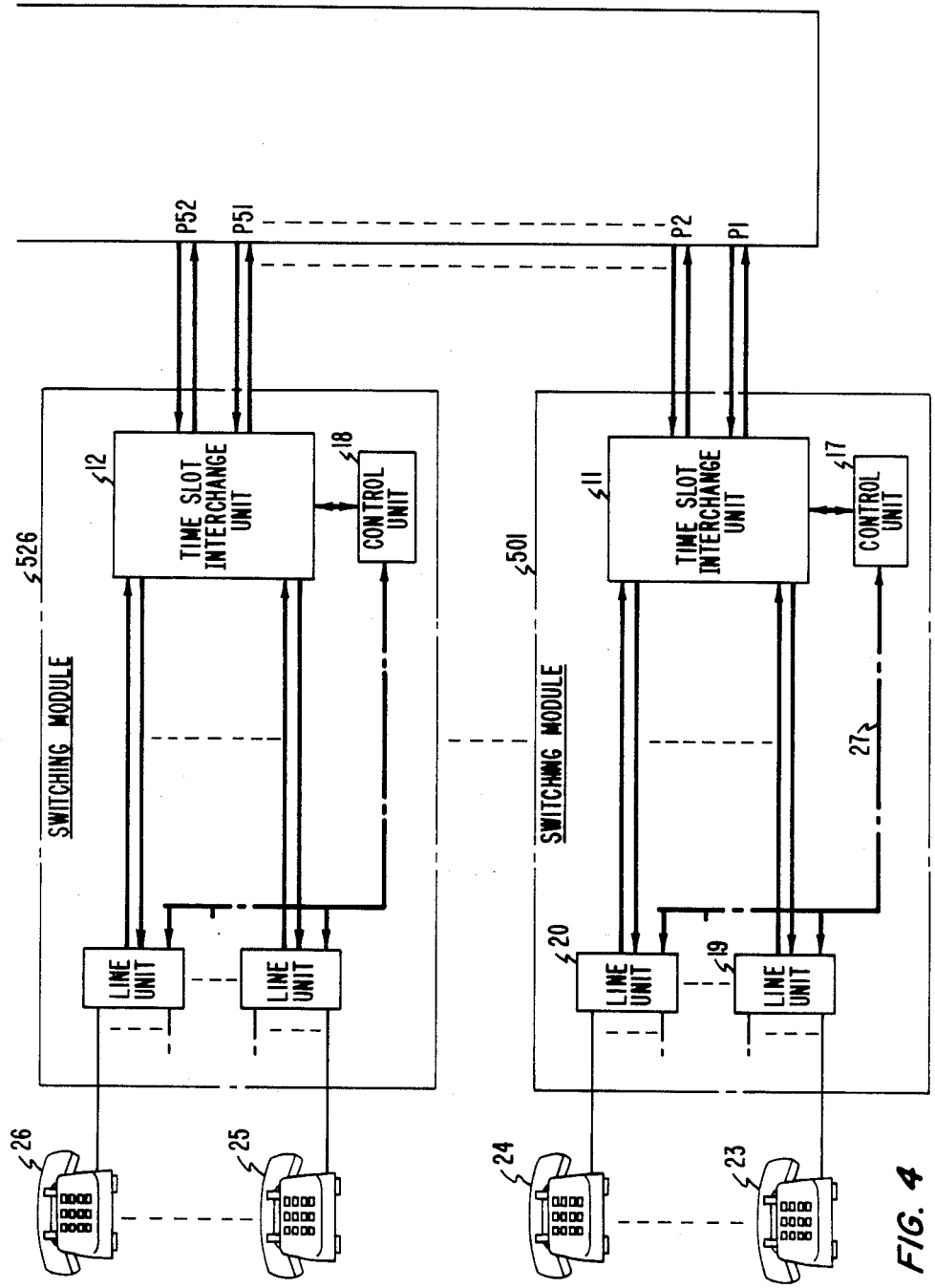
FIGS. 4 through 7, when arranged in accordance with FIG. 16, present a more detailed diagram of an exemplary central office included in the arrangement of FIGS. 2 and 3.

FIGS. 2 and 3, when arranged in accordance with FIG. 15, present a diagram of a specific security arrangement using an illustrative method and apparatus for multi-channel secure communication in accordance with the present invention. The exemplary arrangement of FIG. 2 and 3 replaces the generalized network 1007 of FIG. 1 with a more specific embodiment comprising two central offices 100 and 100' which are directly interconnected via six bidirectional, digital transmission facilities 101 through 106. (In FIGS. 2 and 3, user access lines 1004 and 1004' as well as lines 1005 and 1005' are each drawn as two lines, one for each transmission direction, rather than being drawn as three lines for the individual channels B1, B2 and D as in FIG. 1). The description which follows in arranged in two parts. First the exemplary central office 100 is described. With that as background, the operation of the overall arrangement for secure communication shown in FIGS. 2 and 3 is then described.

Central Office 100

FIGS. 4 through 7, when arranged in accordance with FIG. 16, present a more detailed diagram of the exemplary central office 100. Central office 100 includes 26 switching modules 501 through 526, and a time-multiplexed switch 10 to provide circuit-switched communication channels among a plurality of conventional subscriber sets, e.g., 23 through 26. Time-multiplexed switch 10 includes a time-shared space division switch which operates in frames of 256 time slots or channels of approximately 488 nanoseconds each to complete paths among its 64 input/output port pairs P1 through P64. Each switching module is connected to two input/output port pairs. For example, switching module 501 is connected to input/output port pairs P1 and P2. Each switching module includes a control unit which controls switching module operation including the establishment of circuit-switched channels by a time-slot interchange unit. For example, switching module 501 includes control unit 17 which controls the operation of time-slot interchange unit 11 and switching module 526 includes control unit 18 which controls the operation of time-slot interchange unit 12. Each switching module further includes a number of line units that interface the analog lines from subscriber sets to the time-slot interchange unit. Such line unit interface functions include necessary analog to digital and digital to analog conversions as well as multiplexing and demultiplexing operations. In switching module 501, line units 19 and 20 interface the analog lines from subscriber sets 23 and 24 to time-slot interchange unit 11. The operation of line units 19 and 20 is controlled by control unit 17 via a communication path 27. The switching module control units, e.g., 17 and 18, and a central control 30 used to control the operation of time-multiplexed switch 10, communicate with each other via an interprocessor communication mechanism using predetermined control channels of time-multiplexed switch 10 and a control distribution unit 31. When, for example, control unit 17 first detects an off-hook condition of subscriber set 23 and subsequently detects the dialing of a sequence of digits defining one of the other subscriber sets served by switching module 501, e.g., set 24, control unit 17 and central control 30 exchange control messages and control unit 1 thereafter effects the establishment by time-slot interchange unit 11 of a bidirectional, circuit-switched communication channel between subscriber sets 23 and 24 for the duration of a voice call between those sets 23 and 24. Further, when subscriber set 23 calls a subscriber set served by switching module 526, e.g., set 26, control units 17 and 18 and central control 30 exchange control messages to establish the call. Central control 30 writes instructions via a path 49 into a control memory 29 defining an available time-multiplexed switch 10 channel between time-slot interchange units 11 and 12. Control unit 17 effects the establishment by time-slot interchange unit 11 of a circuit-switched communication channel between subscriber set 23 and the available time-multiplexed switch 10 channel. Similarly, control unit 18 effects the establishment by time-slot interchange unit 12 of a circuit-switched communication channel between subscriber set 26 and the available time-multiplexed switch 10 channel. The switching system of central office 100 is of the time-space-time type with time-slot interchange unit 11 representing the first time stage, time-multiplexed switch 10 the space stage and time-slot interchange unit 12 the second time stage for the call from subscriber set 23 to subscriber set 26. The portion of the system described thus far is disclosed in more detail in U.S. Pat.

No. 4,322,843 issued to H. J. Beuscher et al., on March 30, 1982.

Central office 100 also includes switching module 5000 (FIG. 7) which interfaces central office 100 to six bidirectional, digital transmission facilities 101 through 106 such as the 24-channel T1 carrier system disclosed in U.S. Pat. No. 4,059,731 issued to J. H. Green et al., on Nov. 22, 1977. Switching module 5000 includes a time-slot interchange unit 5011 and an associated control unit 5017 which are substantially identical to time-slot interchange unit 11 and control unit 17, respectively. Time-slot interchange unit 5011 provides circuit-switched communication channels between time-multiplexed switch 10 and the channels of the transmission facilities 101 through 106. Six digital facility interfaces 5021 through 5026 interface time-slot interchange unit 5011 and the transmission facilities 101 through 106. The operation of such digital facility interfaces is described in U.S. Pat. No. 4,550,404, issued Oct. 29, 1985. In the present exemplary embodiment, transmission facilities 101 through 106 are connected to central office 100', with transmission facilities 101 through 103 being located along a first path and transmission facilities 104 through 106 along a second, geographically distinct path. Channel 1 on transmission facility 101 and channel 1 on transmission facility 104 are reserved for control communications between central office 100 and central office 100'. Control communications are effected between central control 30 and the reserved control channels on the transmission facilities 101 and 104 via control distribution unit 31 and predetermined channels of time-multiplexed switch 10 and time-slot interchange unit 5011.

Central office 100 further includes four switching modules 1000, 2000, 3000 and 4000 (FIGS. 5 and 6) to provide both circuit switching and packet switching service to a plurality of user terminals e.g., 1001, 1002, 4001 and 4002, representing, for example, customer teleterminals, vendor databases, telephone operator position terminals or packet access ports. Only switching modules 1000 and 4000 are shown in detail in FIGS. 5 and 6. Each user terminal, e.g., 1002, transmits information to and receives information from its associated switching module, e.g., 1000, in two 64 kilobits per second channels referred to as B-channels and in one 16 kilobits per second channel referred to as a D-channel. The B-channels may be used to convey digitized voice samples at the rate of 8000, eight-bit samples per second or to convey digital data at a rate of 64 kilobits per second. Each B-channel is separately circuit-switched by the office to other user terminals, e.g., 1001, 4001, 4002, or subscriber sets, e.g., 23 through 26, or to the channels of transmission facilities 101 through 106. The two B-channels from a user terminal are referred to herein as the B1 channel and the B2 channel. The D-channel from a user terminal is used both to convey signaling packets to effect message signaling between that user terminal and the office and to convey data packets among user terminals. The D-channel is packet-switched either to other user terminals or to a control unit 1017 which controls the establishment of both circuit-switched calls and packet-switched calls within switching module 1000. The message signaling between user terminals and control unit 1017 can be of either the functional or stimulus types. Functional signaling involves a degree of intelligent processing in its generation or analysis whereas stimulus signaling is either generated as a result of a single event at a user terminal, e.g., a key depression, or contains a basic instruction from the switching system to be executed by a user terminal.

In the present exemplary embodiment, information is conveyed between a user terminal, e.g., 1002, and switching module 1000 via a four-wire, user access line 1004 using one pair of wires for each direction of transmission. User line 1004 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. User line 1004 represents what is referred to by the International Telegraph and Telephone Consultative Committee (CCITT) as the T-interface. The use of the T-interface in the present system is only exemplary. The invention is equally applicable in systems using other access methods.

In switching module 1000, the user lines, e.g., 1003 and 1004, are terminated by two digital line units 1101 and 1102. Information is conveyed between each of the digital line units 1101 and 1102 and a time-slot interchange unit 1011 via a plurality of 32-channel bidirectional time-multiplexed data buses 1201. Further, information is conveyed between each of the digital line units 1101 and 1102 and a packet switching unit 1400 via a plurality of 32-channel bidirectional time-multiplexed data buses 1202. The data buses 1201 are used primarily to convey B-channel information which is circuit switched by time-slot interchange unit 1011 either to user terminals served by switching module 1000 or to time-multiplexed switch 10. However the data buses 1201 are also used to convey D-channel information which is further conveyed via certain time-slot interchange unit 1011 channels that are predetermined at system initialization and via a 32-channel bidirectional data bus 1205 to packet switching unit 1400. Each channel or time slot on the data buses 1201 can include eight B-channel bits from one user terminal or two D-channel bits from each of four different user terminals. The data buses 1202 are used to convey only D-channel information. Each channel or time slot on the data buses 1202 and 1205 can include two D-channel bits from each of four different user terminals.

In the present exemplary embodiment, packet switching unit 1400 includes 96 protocol handlers 1700-0 through 1700-95, and packet interconnect 1800 which interconnects protocol handlers 1700-0 through 1700-95 and a processor interface 1300. Each user terminal, e.g., 1002, is associated with one of the protocol handlers 1700-0 through 1700-95 and, more particularly, with one of 32 High-level Data Link Control (HDLC) circuits (not shown) included in that associated protocol handler. In the present embodiment, communication links are established between the HDLC circuits of the protocol handlers and peer HDLC circuits (not shown) in the user terminals at system initialization. These links are used to convey packets within HDLC frames in accordance with the well-known HDLC protocol. The connections between a given protocol handler and its associated D-channels on data buses 1202 and 1205 are completed by one of six data fanout units (not shown).

The packets conveyed on the D-channel communication links between user terminals and associated protocol handlers are, in general, of variable length. Each user terminal, e.g., 1002, transmits and receives packets in one or more logical communication channels or logical links. In accordance with this example, logical channel LCN1 is used to convey signaling packets to set up both circuit-switched and packet-switched calls to and from user terminal 1001 and logical channels LCN2 through LCN6 are used to convey data packets during packet-switched calls to and from user terminal 1002. The logical channel number of each packet is defined by part of a header of that packet. Each packet received by a protocol handler from a user terminal is stored in a random access memory (not shown) in that protocol handler. If the received packet is a signaling packet, i.e., it was received in logical channel LCN1, it is transmitted via packet interconnect 1800 to processor interface 1300. If the received packet is a data packet, i.e., it was received in one of the logical channel LCN2 through LCN6, and a packet-switched call has previously been established, it is transmitted via packet interconnect 1800 to the protocol handler associated with the destination user terminal for subsequent transmission thereto. (If the packet-switched call is established between two user terminals that are associated with the same protocol handler, the data packets need not be transmitted via packet interconnect 1800. Instead, the protocol handler simply transmits the data packets in the appropriate channel to the destination user terminal.)

When a given protocol handler, e.g., 1700-0, has received a complete packet from a user terminal and has determined the destination of that packet, i.e., either one of the other protocol handlers or processor interface 1300, it transmits a logic zero Request To Send (RTS) signal, also referred to herein as a request signal, on one conductor of a six-conductor bus 1701-0 to packet interconnect 1800. Similarly, when processor interface 1300 has a packet ready for transmission to one of the protocol handlers, it transmits a logic zero RTS signal on one conductor of a six-conductor bus 1301. Packet interconnect 1800 enables each of the protocol handlers and the processor interface 1300 to transmit in a predetermined sequence. Since processor interface 1300 transmits signaling packets to all of the user terminals served by switching module 1000, the sequence effected by packet interconnect 1800 enables processor interface 1300 sixteen times for each enabling of an individual protocol handler. When the packet interconnect 1800 sequence reaches protocol handler 1700-0, packet interconnect 1800 responds to the RTS signal on bus 1701-0 by transmitting a logic zero Clear To Send (CTS) signal, also referred to herein as a clear signal, on a second conductor of bus 1701-0 to protocol handler 1700-0. Protocol handler 1700-0 responds to the CTS signal by transmitting its stored packet at a high rate, e.g., 10 megabits per second, via packet interconnect 1800 to its destination. All of the protocol handlers and the processor interface 1300 can receive the packet, but in the present embodiment, typically only one destination as defined by the packet header actually stores the packet for subsequent transmission. Only after the complete packet has been transmitted by protocol handler 1700-0, does the packet interconnect 1800 sequence resume. The receipt of the packet by the destination protocol handler or by processor interface 1300 is acknowledged by the transmission of an acknowledgment packet back to protocol handler 1700-0.

The other three switching modules equipped for packet switching are substantially identical to switching module 1000. In switching module 4000, the elements are numbered exactly 3000 greater than their counterpart elements in switching module 1000. The protocol handlers 1700-0 through 1700-95 and the processor interface 1300 in switching module 1000 and their counterpart elements in switching module 4000 are referred to herein as packet switching nodes since they accumulate received data bits into packets and subsequently transmit the packets on toward their destinations. In the present example, protocol handlers 1700-0 and 1700-2 through 1700-95 are connected to the D-channels from user terminals and are referred to as user packet switching nodes. Since processor interface 1300 is connected to convey control information to and from control unit 1017, processor interface 1300 is referred to as a control packet switching node. One protocol handler in each switching module, e.g., protocol handler 1700-1 in switching module 1000 and protocol handler 4700-1 in switching module 4000, is used for switching data packets for inter-module packet calls and is referred to as an intermediate packet switching node.

In the present embodiment, four channels on data bus 1205 are connected at system initialization by time-slot interchange unit 1011 to four channels, e.g., channels 109 through 112, at input/output port pair P55 of time-multiplexed switch 10. Similarly, four channels on data bus 4205 (FIG. 3) are connected by time-slot interchange unit 4011 to channels 109 through 112 at input/output port pair P61. Control memory 29 defines that a bidirectional communication path is to be established between input/output port pairs P55 and P61 during channels 109 through 112 of each time-multiplexed switch 10 cycle. By the use of these predefined connections, protocol handlers 1700-1 and 4700-1 can transmit packets either one packet at a time at a rate of 256 kilobits per second using all four channels, or up to four packets at a time each at a rate of 64 kilobits per second and each using one of the four channels, or various other combinations. (When multiple channels are used to transmit packets at rates of $n \times 64$ kilobits per second, the connections must be made through time-slot interchange units 1011 and 4011 in such manner that the bits of the $n \times 64$ kilobits per second bit stream, are received by protocol handler 4700 1 in the same order that they were transmitted by protocol handler 1700-1.) Assume that user terminal 1001 is associated with protocol handler 1700-0 and user terminal 4001 is associated with protocol handler 4700-0. Once a packet-switched call has been established between user terminals 1001 and 4001, a data packet is first transmitted from user terminal 1001 to protocol handler 1700-0 at a rate of 16 kilobits per second and stored. When enabled by packet interconnect 1800, protocol handler 1700-0 then transmits the data packet at a 10 megabits per second rate to protocol handler 1700-1. Protocol handler 1700-1 transmits the data packet via the predetermined channels of bus 1205, time-slot interchange unit 1011, time-multiplexed switch 10, time-slot interchange 4011 and bus 4205 to protocol handler 4700-1 at, for example, a 256 kilobits per second rate. When enabled by packet interconnect 4800, protocol handler 4700-1 then transmits the data packet at the 10 megabits per second rate to protocol handler 4700-0. Finally protocol handler 4700-0 transmits the data packet at the rate of 16 kilobits per second to user terminal 4001. Of course, appropriate entries must be made in routing tables in each of the protocol handlers 1700-0, 1700-1, 4700-1 and 4700-0 as part of the process of establishing such a packet-switched call. The operation of packet switching unit 1400 and processor interface 1300 in providing message signaling and packet switching capabilities is described in greater detail in U.S. Pat. No. 4,592,048, issued on May 27, 1986 to M. W. Beckner et al.

Central office 100 also includes a master security unit 33 connected to switching module 4000. The use of master security unit 33 in providing communication security is described later herein.

Communication Security

Figure 5:
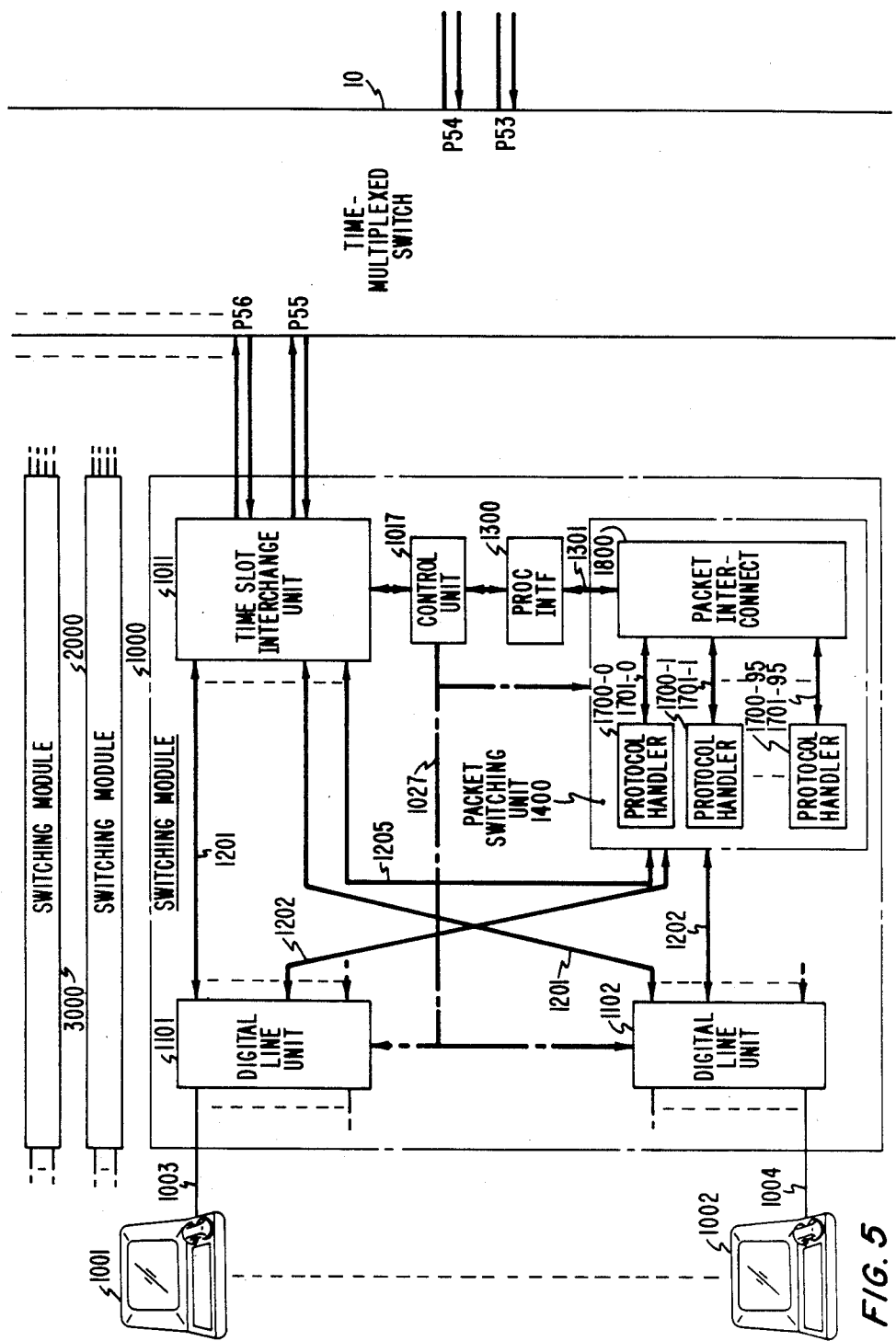
Figure 6:
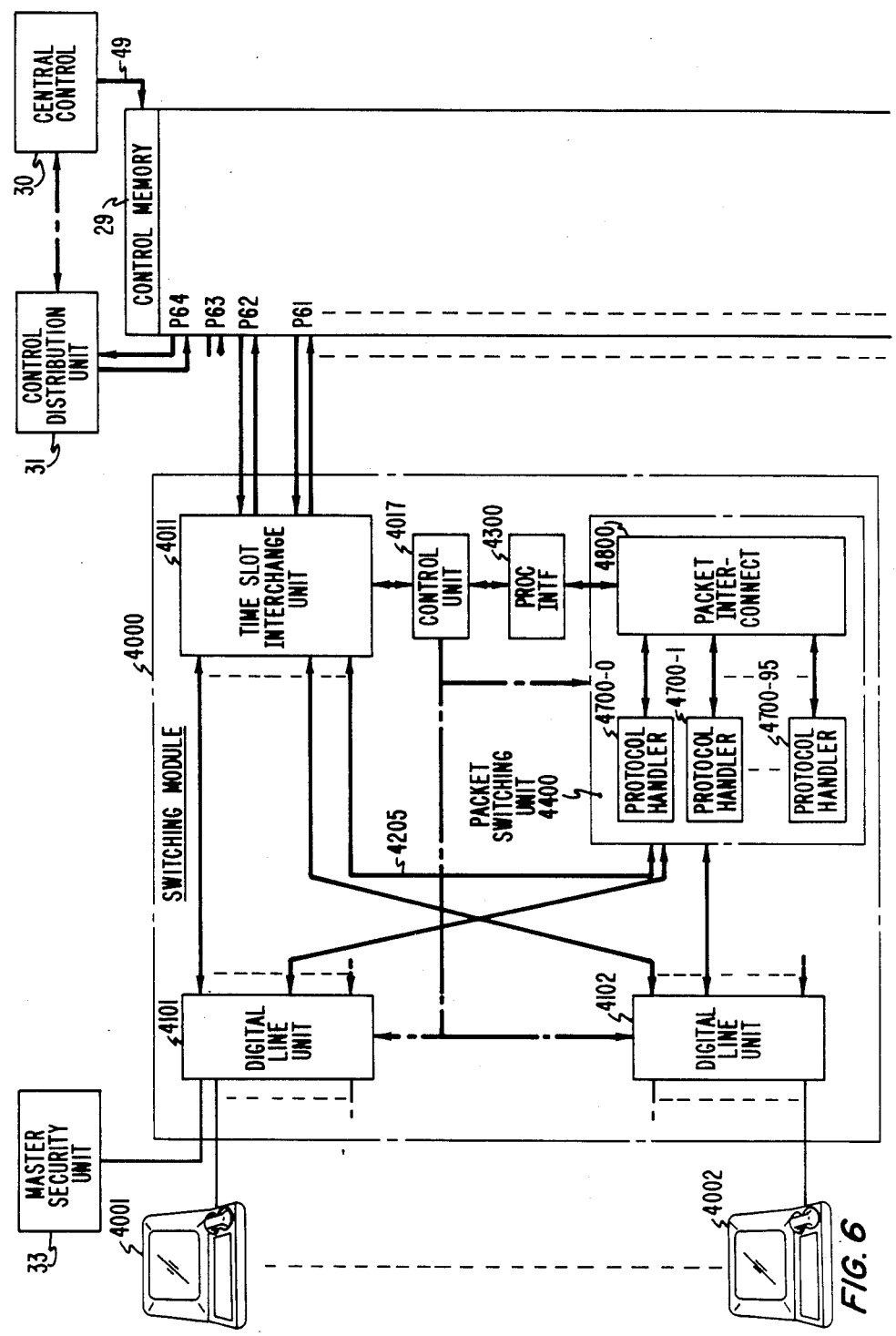
Figure 7:
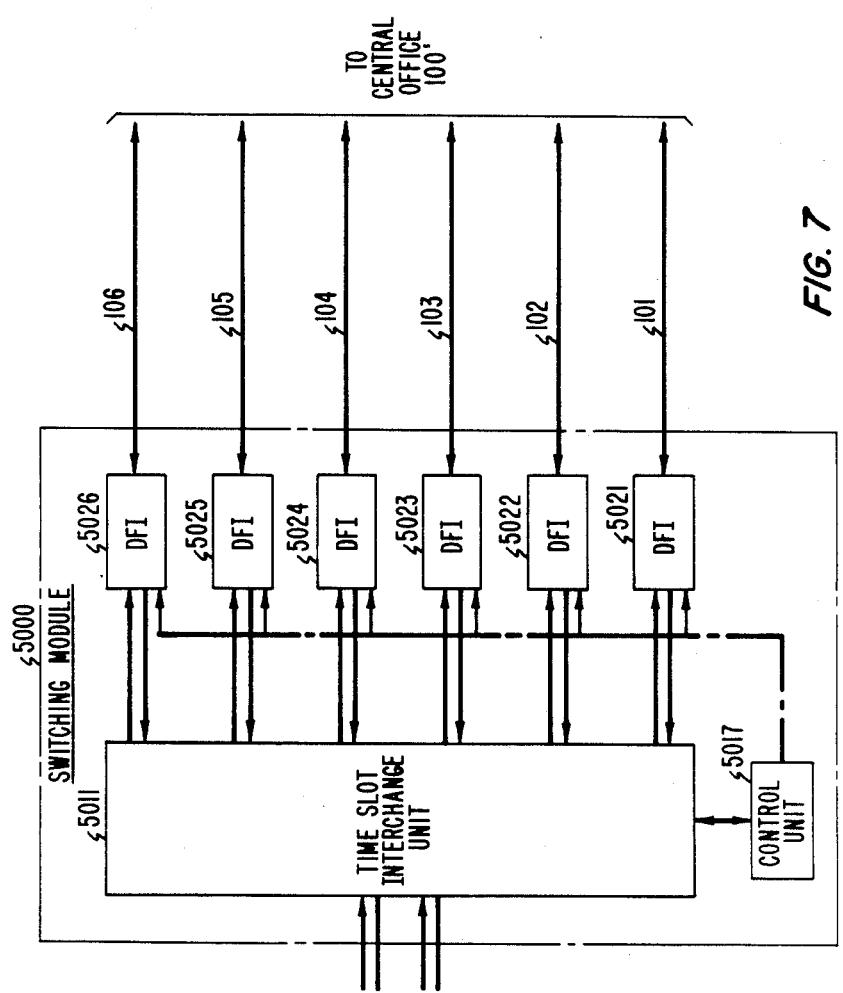

The operation of the security arrangement of FIGS. 2 and 3 is described with reference to the transmission of a message from user terminal 1002 served by central office 100 to user terminal 1002' served by central office 100'. Recall that user terminal 1002 is connected to switching module 1000 via the four-wire, user access line 1004 using one pair of wires for each direction of transmission. (In FIG. 2, user access line 1004 is drawn as two lines, one for each transmission direction.) Also recall that of the 192 kilobits per second bit stream on access line 1004, 144 kilobits per second are used to convey user information including message signaling. The 144 kilobits per second comprises two 64 kilobits per second circuit-switched B-channels B1 and B2 and one 16 kilobits per second packet-switched D-channel. User terminal 1002 transmits the 192 kilobits per second bit stream in 48-bit line frames at the rate of 4000 line frames per second. Each 48-bit line frame includes a framing bit that uses a bipolar violation to mark the start of a frame, various other control bits, DC balancing bits, superframe bits and spare bits and also includes two, 8-bit occurrences of each of the two B-channels and two, 2-bit occurrences of the single D-channel. The circuitry required to combine the two B-channels and the D-channel from user terminal 1002 into these 48-bit line frames, although not shown in FIG. 5, is explicitly represented in FIG. 2 by T-interface circuit 120. To provide user terminal 1002 with the capability for secure communication in accordance with the invention, a secure communication terminal adapter 130 is included between T-interface circuit 120 and user access line 1004. The four-wire line that connects T-interface circuit 120 with terminal adapter 130 is designated in FIG. 2 as line 1005.

Terminal adapter 130 has two operation modes: NORMAL and SECURE. In the NORMAL mode, adapter 130 conveys bit streams between lines 105 and 104 without change. In the SECURE mode, adapter 130 performs various operations described herein on the bit streams to provide communication security. Terminal adapter 130 includes a transmit unit 131 which receives the 192 kilobits per second bit stream from T-interface circuit 120 via line 1005 and extracts the two B-channels B1 and B2 and the D-channel therefrom. In the SECURE MODE, transmit unit 131 splits the information received in a given B-channel, e.g., channel B1 from user terminal 1002, between the two B-channels B1 and B2 in accordance with one of a number of possible splitting routines. Transmit unit 131 transmits such split B-channels to central office 100 via access line 1004. For example, consecutive bits received in the given channel B1 from user terminal 1002 may be alternately transmitted in the channels B1 and B2 to central office 100. Such message splitting in and of itself represents a first level of security. As an additional security measure, transmit unit 131 also separately encrypts the split B-channels by adding random numbers thereto as described later herein. Of course many other methods of encrypting the split B-channels could also be used. Transmit unit 131 is controlled by a processor 133 having an associated memory 134 that stores the splitting routines available to terminal adapter 130 as well as a table of seed values used to initiate the generation of random numbers. The split B-channels are combined with the D-channel in a T-interface circuit 135, which is substantially identical to T-interface circuit 120, and the reformed 192 kilobits per second bit stream is transmitted by T-interface circuit 135 to switching module 1000 via user access line 1004.

Terminal adapter 130 further includes a receive unit 132 which receives two B-channels B1 and B2 and one D-channel extracted by T-interface circuit 135 from the 192 kilobits per second bit stream received on user access line 1004 from switching module 1000. Receive unit 132 is also controlled by processor 133. In the SECURE mode, receive unit 132 first separately decrypts the two B-channels B1 and B2 by subtracting random numbers therefrom, and then performs a combining routine that is the inverse of the splitting routine performed by the transmit unit in the secure communication terminal adapter at the other end of the communication. Such combining routines are also stored in memory 134. For example, alternate bits from the B-channels B1 and B2 may be consecutively transmitted on only one of the two B-channels, e.g., channel B1. Receive unit 132 then multiplexes the D-channel and the B-channels B1 and B2 that result from the combining routine and transmits a 192 kilobits per second bit stream on line 1005 to T-interface circuit 120.

In the exemplary arrangement of FIGS. 2 and 3, central office 100' is substantially identical to central office 100 except that central office 100' does not include a master security unit equivalent to master security unit 33 in central office 100. In addition, secure communication terminal adapter 130', which provides for secure communications with user terminal 1002', is substantially identical to terminal adapter 130. The correspondence of elements between FIGS. 2 and 3 is indicated using the prime (') notation on the designations of FIG. 3.

When terminal adapter 130 is operating in the SECURE mode, a given message transmitted from user terminal 1002 in the B-channel B1 is split by transmit unit 131 among the B-channels B1 and B2 according to a selected splitting routine and the resulting B-channels B1 and B2 are separately encrypted by adding separate random number sequences RN1 and RN2 to those channels. To recover the given message at user terminal 1002', the receive unit 132' of terminal adapter 130' must first subtract the same random number sequences RN1 and RN2 from the received B-channels B1 and B2 and then recombine those channels in accordance with a combining routine that is the inverse of the selected splitting routine. Assume for example that there are up to 100 available splitting routines but that each of the secure communication terminal adapters stores only some subset of those available routines. Terminal adapter 130 might have splitting routines 1, 2, 3, 4 and 5 while terminal adapter 130' has splitting routines 3, 4, 5, 6 and 7. In order for a secure call to be set up, a commonly available splitting routine, e.g., routine 3, must be selected. Terminal adapter 130 will then split the message according to splitting routine 3 and terminal adapter 130' will recombine the B-channels according to the combining routine which is the inverse of splitting routine 3. The random number sequences RN1 and RN2 are generated by random number generators in transmit unit 131 in response to seed values S1 and S2. Random number generators included in receive unit 132' must be informed of the seed values S1 and S2 in order to generate the same random number sequences RN1 and RN2. The selection of the splitting routine and the seed values to use for a particular call are made by the central offices 100 and 100'. The possible splitting routines and seed values are stored in different memory locations in each terminal adapter. Therefore central office 100 informs terminal adapter 130 indirectly of the splitting routine and seed values to be used for a given call by transmitting references defining the memory locations where the splitting routine and seed values are stored in terminal adapter 130 rather than transmitting a direct definition. The same is true when such information is conveyed between central offices 100 and 100'. Because of this indirection, an unauthorized listener who obtains a secure communication terminal adapter and intercepts the message defining the splitting routine and seed values, is unable to directly use the intercepted information to reconstruct subsequent messages.

Because the two B-channels B1 and B2 may encounter differing time delays, a special character comprising eight ones (11111111) is inserted by transmit unit 131 in each B-channel defining where the splitting routine and random number addition is initiated. Thus receive unit 132' can detect the special character to determine precisely where to begin the random number subtraction and recombining of channels even though the two channels are not necessarily received in synchronism.

In the present embodiment, secure two-way calls are established using the same splitting routine and seed values for each direction of transmission. However different routines and seed values could be used for the two transmission directions.

Secure Call Setup

Circuit switched calls are established among the user terminals served by the central offices 100 and 100' using message signaling. Message signaling is implemented in switching module 1000 (FIG. 5) by transmitting signaling packets on the user D-channel to the associated protocol handler and switching those packets via packet interconnect 1800 to processor interface 1300. The signaling information is then read from processor interface 1300 by control unit 1017. Control information from control unit 1017 is transmitted in signaling packets by processor interface 1300 via packet interconnect 1800 to a given protocol handler and then to one of its associated user D-channels. Recall that the switching module control units, e.g., 1017 and 4017, and central control 30 communicate with each other using predetermined control channels of time-multiplexed switch 10 and control distribution unit 31. In the present embodiment, switching module control unit 1017 communicates with user terminal 1002 using logical channel LCN1 on the D-channel of user access line 1004. Control unit 1017 communicates with terminal adapter 130 using logical channel LCN7 on the D-channel of user access line 1004. Recall that channel 1 on transmission facility 101 and channel 1 on transmission facility 104 are reserved for control communications and that control communications are effected between central control 30 and the reserved control channels on the transmission facilities 101 and 104 via control distribution unit 31 and predetermined channels of time-multiplexed switch 10 and time-slot interchange unit 5011.

Figure 8:
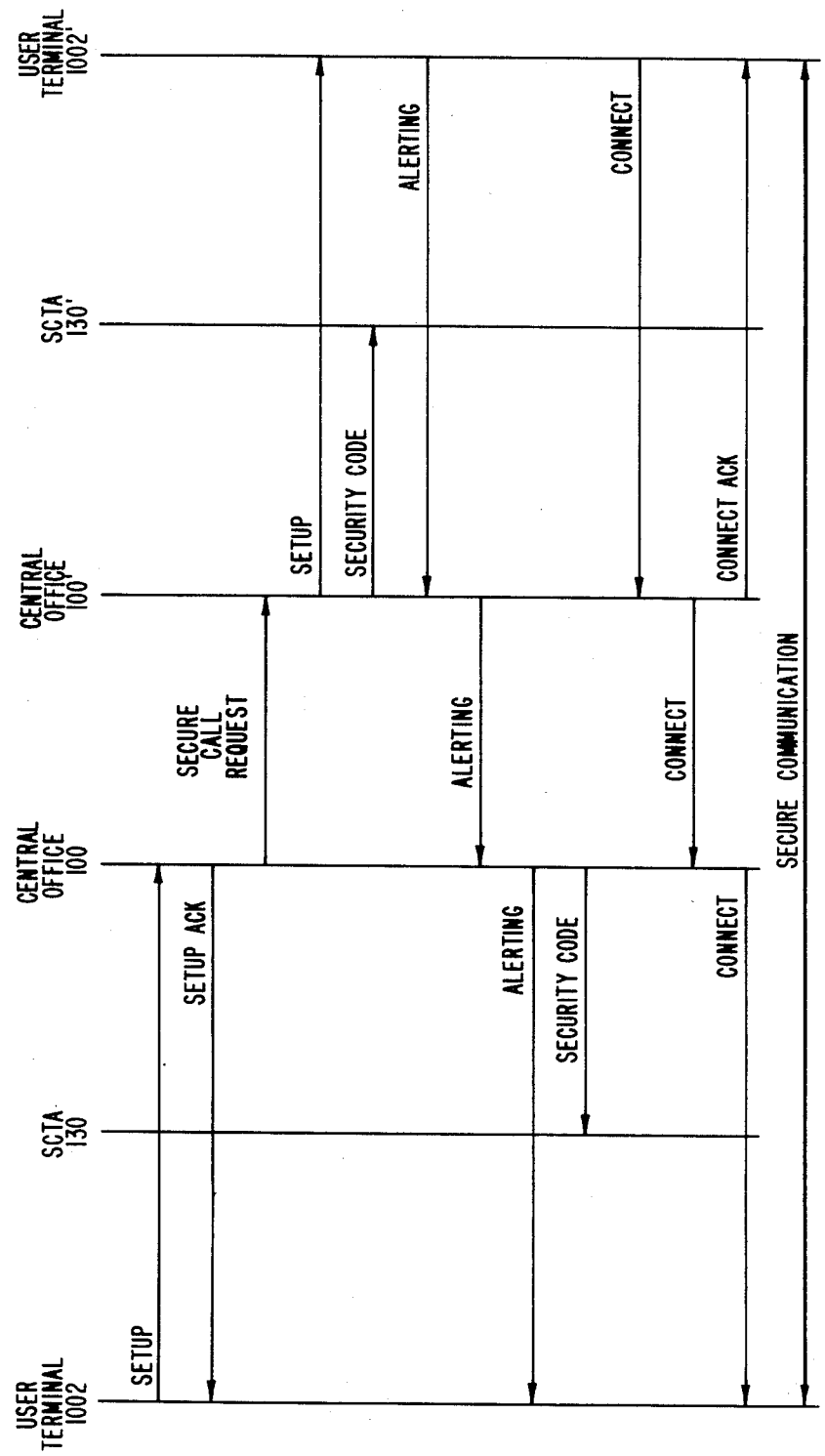
FIG. 8 is a time sequence diagram illustrating the exchange of control messages to establish a secure call in the arrangement of FIGS. 2 and 3.

FIG. 8 is a time sequence diagram describing the flow of messages among user terminals 1002 (FIG. 2) and 1002' (FIG. 3) and central offices 100 and 100', and from central offices 100 and 100' to terminal adapters 130 and 130', in order to establish a secure two-way circuit-switched call from user terminal 1002 to user terminal 1002'. Initially, user terminal 1002 transmits a SETUP message to central office 100 indicating a request to complete a secure two-way call to user terminal 1002'. The SETUP message includes the directory number of user terminal 1002' and a special field defining the call as a secure two-way call. In the present embodiment, the definition by user terminal 1002 of a call as a secure two-way call implies that the circuit-switched B-channels B1 and B2 from user terminal 1002 are not to be connected to different destinations but instead are to be connected to the corresponding B-channels B1 and B2 of the defined destination user terminal. Within central office 100, the SETUP message is first received by control unit 1017 (FIG. 5) which responds by returning a SETUP ACK message to user terminal 1002 verifying the receipt of the SETUP message. Control unit 1017 subsequently forwards the SETUP message to central control 30. Central control 30 responds by determining that the directory number in the SETUP message defines a user terminal served by central office 100'. Recall that transmission facilities 101 through 103 are located along a first path to central office 100' and that transmission facilities 104 through 106 are located along a second, geographically distinct path. Since the call is defined as a secure call, central control 30 allocates one channel along each path for the call, e.g., channel 12 on transmission facility 102 and channel 19 on transmission facility 104. Central control 30 also determines the splitting routines that are available at terminal adapter 130. Central control 30 then transmits a SECURE CALL REQUEST message to central control 30' of central office 100'. The SECURE CALL REQUEST message defines the directory number of user terminal 1002' as well as defining the call as a two-way secure call. The SECURE CALL REQUEST message also includes indirect references to the available splitting routines and defines the two allocated call channels on transmission facilities 102 and 104. Central control 30' determines based on the directory number that user terminal 1002' served by switching module 1000' is the call destination. Central control 30' also determines the splitting routines available at terminal adapter 130' and selects a commonly available splitting routine to be used for the call. Central control 30' also selects the seed values S1 and S2 to be used for the call. Central control 30' then forwards the SECURE CALL REQUEST message to the switching module 1000' control unit which determines whether user terminal 1002' is busy or idle. If terminal 1002' is idle, the switching module 1000' control unit transmits a SETUP message to user terminal 1002' defining transmits a SECURITY CODE message via the switching module 1000' control unit to terminal adapter 130' including indirect references to the selected splitting routine and seed values. In response to the SETUP message from the switching module 1000' control unit, user terminal 1002' returns an ALERTING message to central office 100' confirming the arrival of the SETUP message and transferring call progress information equivalent to audible ringing tones. The ALERTING message is received by the switching module 1000' control unit and then forwarded to central control 30' which adds to the received message, indirect references to the splitting routine and seed values, and then transmits the resulting ALERTING message to central office 100. Central office 100 forwards the ALERTING message on to user terminal 1002. Central office 100 also transmits a SECURITY CODE message to terminal adapter 130 indirectly defining the splitting routine and seed values. When the user at user terminal 1002' answers the incoming call, user terminal 1002' transmits a CONNECT message to central office 100'. The B-channels from user terminal 1002' are connected by central office 100' to channel 12 on transmission facility 102 and channel 19 on transmission facility 104. The CONNECT message is then forwarded to central office 100. The B-channels from user terminal 1002 are connected by central office 100 to channel 12 on transmission facility 102 and channel 19 on transmission facility 104. Central office 100' transmits a CONNECT ACK message to user terminal 1002' and central office 100 forwards the CONNECT message to user terminal 1002 to inform both user terminals 1002 and 1002' that the call has been set up. The secure communication between user terminals 1002 and 1002' can now begin.

Transmit Unit 131

Figure 9:
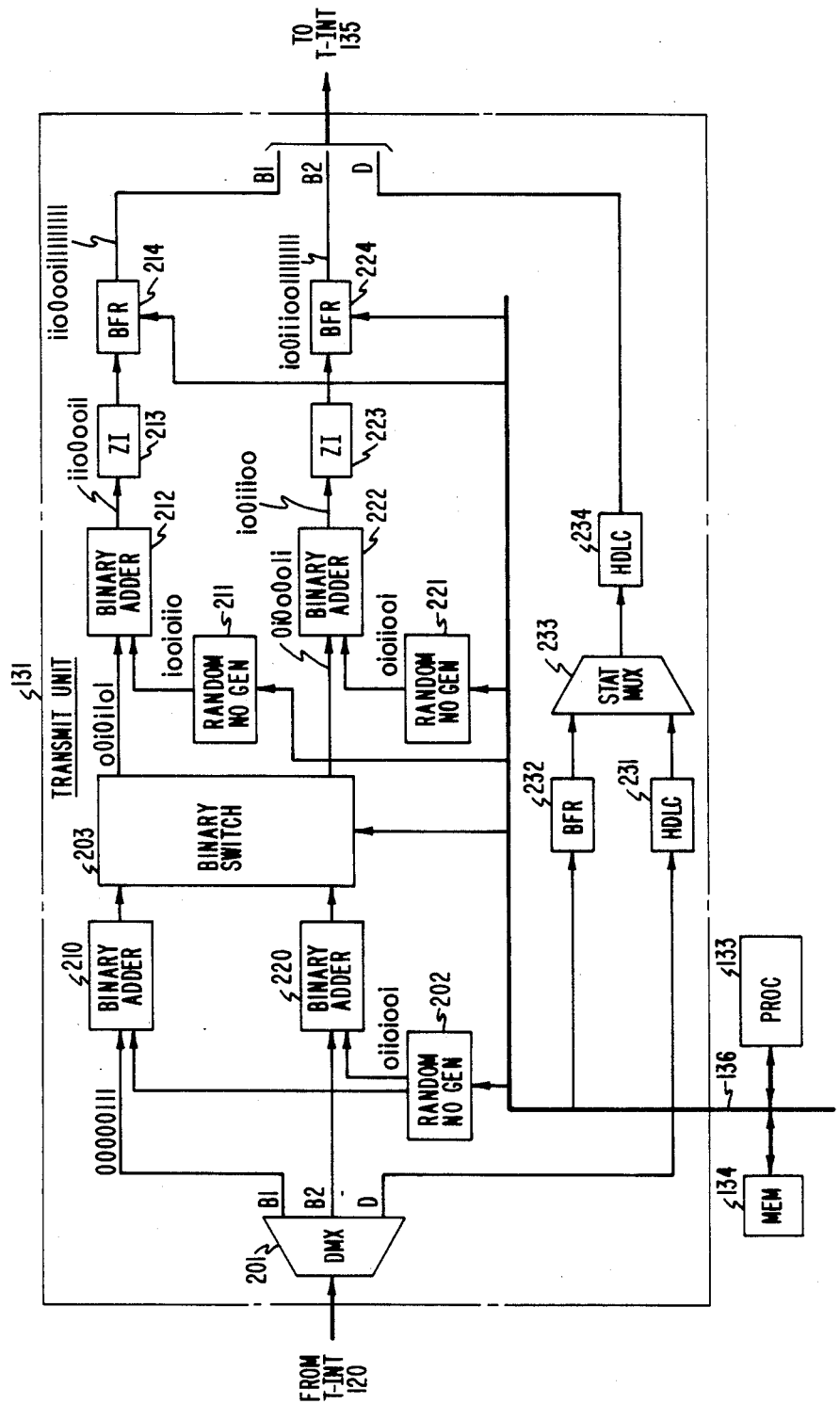
FIG. 9 and FIG. 10 are detailed diagrams of a transmit unit and a receive unit included in secure communication terminal adapters in the arrangement of FIGS. 2 and 3.

FIG. 9 is a circuit diagram of the transmit unit 131 in terminal adapter 130. A demultiplexer 201 receives the 192 kilobits per second bit stream transmitted by T-interface circuit 120 on line 1005 and extracts therefrom the two 64 kilobits per second B-channels B1 and B2 and the 16 kilobits per second D-channel. Demultiplexer 201 transmits the B-channels B1 and B2 to respective first input terminals of two binary adders 210 and 220. A random number generator 202, which is included to fill either of the B-channels with a random bit stream when such B-channel is not being used, is connected to the second input terminals of binary adders 210 and 220. Each of the adders 210 and 220 adds the bit streams received at its two input terminals and transmits the sum bit stream to one of the input terminals of a binary switch 203 which performs the message splitting function. The two output terminals of binary switch 203 are connected to respective first input terminals of two binary adders 212 and 222. Binary switch 203 receives instructions defining the splitting routine selected for a given call from processor 133 via bus 136. Binary switch 203 transmits each bit received from binary adder 210 to either binary adder 212 or binary adder 222 in accordance with the received instructions. Similarly, binary switch 203 transmits each bit received from binary adder 220 to either binary adder 212 or binary adder 222. The binary adders 212 and 222 are included to separately encrypt the split B-channels by adding random bit streams thereto. Random number generators 211 and 221, which generate random numbers in response to seed values received from processor 133 via bus 136, transmit random bit streams to respective second input terminals of the binary adders 212 and 222. The sum bit streams generated by binary adders 212 and 222 are transmitted to zero insertion circuits 213 and 223, respectively. Recall that the special character 11111111 is used to mark the beginning of the splitting and random number addition operations on the B-channels. The zero insertion circuits 213 and 223 are included to prevent eight consecutive ones from being present in the bit stream and being confused with the special character. Accordingly, zero insertion circuits 213 and 223 insert a zero after each occurrence of seven consecutive ones in the bit streams transmitted by binary adders 212 and 222 respectively. The operation of the zero insertion circuits 213 and 223 is analogous to the bit stuffing operation which adds a zero after each occurrence of five consecutive ones in the well-known HDLC protocol. The bit streams that result from the zero insertion operation are transmitted by zero insertion circuits 213 and 223 to two buffers 214 and 224. When the splitting and random number addition operations are initiated, the special character 11111111 is stored in each of the buffers 214 and 224 by processor 133 via bus 136. When the first bits resulting from the initiation of the splitting and random number addition operations, reach buffers 214 and 224, the special character 11111111 is transmitted from each buffer immediately followed by those first bits. The bit streams transmitted from buffers 214 and 224 are transmitted as the B-channels B1 and B2 to T-interface circuit 135.

The D-channel extracted by demultiplexer 201 is transmitted to an HLDC circuit 231 which terminates the well-known HDLC protocol from a peer HDLC circuit (not shown) included in user terminal 1002. HDLC circuit 231 extracts packets from received HDLC frames and transmits those packets to a first input terminal of a statistical multiplexer 233. In accordance with the present example, the packets received from user terminal 1002 are in the logical channels LCN1 through LCN6. Processor 133 also transmits information to central office 100 by storing packets in a buffer 232. Such packets are defined to be in logical channel LCN7 and are subsequently transmitted to a second input terminal of multiplexer 233. Multiplexer 233 transmits packets in logical channels LCN1 through LCN7 to an HDLC circuit 234 which places such packets in HDLC frames for transmission on the D-channel to T-interface circuit 135.

As an example, consider that the message 00000111 is transmitted in the B-channel B1 from user terminal 1002. (Consider that the temporal sequence of transmission of the bits in the message 00000111 goes from right to left. In other words, first three consecutive ones are transmitted and then five consecutive zeroes.) Assume that the B-channel B2 is not being used. Therefore random number generator 202 is enabled to transmit a random bit sequence to binary adder 220. The particular random bit sequence generated is denoted as oiioiooi where the letters "o" and "i" represent the bits 0 and 1 but are used so as to be distinguishable from the original 0 and 1 bits of the message 00000111. The splitting routine selected for this particular call amounts to simple alternation. Binary switch 203 transmits the first 1 of the message 00000111 to binary adder 212, the second 1 to binary adder 222, the third 1 to binary adder 212, the first 0 to binary adder 222, the second 0 to binary adder 212 and so on. Similarly, binary switch 203 transmits the first i of the random bit sequence oiioiooi to binary adder 222, the first o to binary adder 212, the second o to binary adder 222, the second i to binary adder 212, etc. The result of performing this particular splitting operation on the message 00000111 and the random bit stream oiioiooi is that binary switch 203 transmits the bit stream o0i0i1o1 to binary adder 212 and transmits the bit stream 0i0o0o1i to binary adder 222. In this example, the two "1"s and the two "0"s of the bit stream o0i0i1o1 are referred to individually herein as first portions of the original message 00000111 and collectively comprise what is referred to herein as a first component of the original message. The single "1" and three "0"s of the bit stream 0i0o0o1i are individually second portions of the original message 00000111 and collectively comprise a second component of the original message. Assume that random number generators 211 and 221 generate the random bit streams iooioiio and oioiiooi respectively, in response to the seed values from processor 133. Binary adder 212 adds the bit stream o0i0i1o1 received from binary switch 203 and the random bit stream iooioiio from random number generator 211 and transmits the sum bit stream iio0ooi1 to zero insertion circuit 213. Binary adder 222 adds the bit stream 0i0o0o1i received from binary switch 203 and the random bit stream oioiiooi from random number generator 221 and transmits the sum bit stream io0iiioo to zero insertion circuit 223. Since the streams iio0ooi1 and io0iiioo do not contain seven consecutive ones, those streams are transmitted on to buffers 214 and 224 without change. The special character 11111111 is added at the beginning of the bit streams in buffers 214 and 224 and the resulting streams iio0ooi111111111 and io0iiioo11111111 are transmitted as the B-channels B1 and B2 to T-interface circuit 135.

Figure 10:
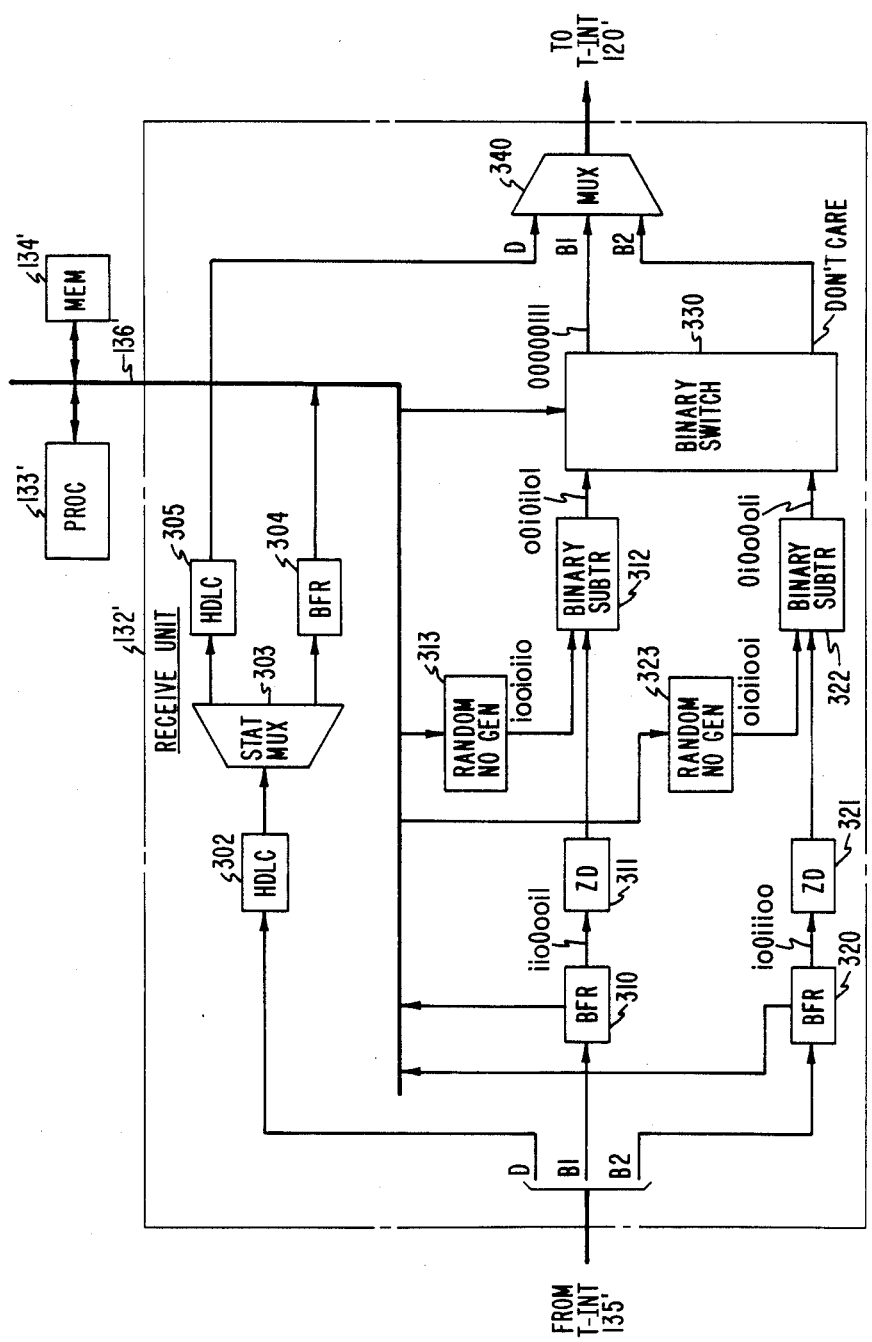

FIG. 10 is a circuit diagram of the receive unit 132' in terminal adapter 130'. The two 64 kilobits per second B-channels B1 and B2 from T-interface circuit 135' are received in buffers 310 and 320 respectively. Processor 133' monitors via bus 136' the contents of the buffers 310 and 320 to detect the special character 11111111. Buffers 310 and 320 begin transmitting bits to two zero deletion circuits 311 and 321 only after the special character has been received in both buffers 310 and 320. The zero deletion circuits 311 and 321 remove any zero that follows seven consecutive ones to undo the zero insertion that was performed at the transmit unit 131 of terminal adapter 130. The resulting bit streams are transmitted to respective first input terminals of two binary subtracters 312 and 322. Random number generators 313 and 323 receive the same seed values from processor 133' via bus 136' that random number generators 211 and 221 received in transmit unit 130 and therefore transmit corresponding random bit streams to respective second input terminals of binary subtracters 312 and 322. Binary subtracters 312 and 322 perform the subtraction operation and transmit the difference bit streams to respective input terminals of binary switch 330. Binary switch 330 receives instructions from processor 133' via bus 136' to switch its two input terminals to its two output terminals in accordance with a combining routine that is the inverse of the splitting routine performed by binary switch 203 in transmit unit 131. The recombined bit streams are transmitted as the B-channels B1 and B2 to multiplexer 340.

The 16 kilobits per second D-channel received from T-interface circuit 135' is transmitted to an HDLC circuit 302 which terminates the HDLC protocol from a peer HDLC circuit (not shown) in switching module 1000'. HDLC circuit 302 extracts packets from received HDLC frames and transmits those packets to a statistical demultiplexer 303. Demultiplexer 303 transmits packets received in logical channels LCN1 through LCN6 on to an HDLC circuit 305 which places such packets in HDLC frames for transmission on the D-channel to multiplexer 340. Multiplexer 340 receives the two B-channels B1 and B2 and the D-channel and inserts such channels into 48-bit line frames for transmission as a 192 kilobits per second bit stream to T-interface circuit 120'. Packets received by statistical multiplexer 303 in logical channel LCN7 are transmitted to a buffer 304 from which they are subsequently read by processor 133' via bus 136'. Logical channel LCN7 is used for transmitting control information, such as the above-described SECURITY CODE message, from central office 100' to terminal adapter 130'.

Returning to the example, recall that the bit streams iio0ooi111111111 and io0iiioo11111111 were transmitted in the B-channels B1 and B2 from terminal adapter 130. Those bit streams are conveyed through the central offices 100 and 100' and are received by terminal adapter 130' in its B-channels B1 and B2. The detection of the special character 11111111 in buffers 310 and 320 by processor 133' indicates that the random number subtraction and combining operations are to begin with the bits immediately following. Thus buffers 310 and 320 transmit the bit streams iio0ooi1 and io0iiioo to zero deletion circuits 311 and 321. Since the bit streams iio0ooi1 and io0iiioo do not contain seven consecutive ones followed by a zero, those streams are transmitted on to binary subtracters 312 and 322 without change. Since the random number generators 313 and 323 receive the same seed values as did the random number generators 211 and 221 in transmit unit 131, random number generators 313 and 323 transmit the corresponding bit streams iooioiio and oioiiooi to binary subtracters 312 and 322. Binary subtracter 312 subtracts the random bit stream iooioiio generated by random number generator 313 from the bit stream iio0ooi1 transmitted by zero deletion circuit 311, and transmits the difference bit stream o0i0i1o1 to the first input terminal of binary switch 330. Binary subtracter 322 subtracts the random bit stream oioiiooi generated by random number generator 323 from the bit stream io0iiioo transmitted by zero deletion circuit 321, and transmits the difference bit stream 0i0o0o1i to the second input terminal of binary switch 330. The combining routine effected by binary switch 330 is the inverse of the selected splitting routine performed in transmit unit 130. Thus binary switch 330 transmits the first 1 of the bit stream o0i0i1o1 in B-channel B1, the first o in channel B2, the second 1 in channel B1, the first i in channel B2, the first 0 in channel B1 and so on. Similarly, binary switch 330 transmits the first i of the bit stream 0i0o0o1i in channel B2, the first 1 in channel B1, the first o in channel B2, the first 0 in channel B1, etc. Thus the original message 00000111 is reformed in channel B1. Since channel B2 is not being used in the present example, the bit stream present in channel B2 is not relevant.

Recall that each of the secure communication terminal adapters may have only a subset of the potential splitting routines stored therein. In order to establish a secure call as described above, it was necessary to select a splitting routine that was available at both the originating and terminating terminal adapters. If there is no commonly available splitting routine, the secure call can still be completed using master security unit 33 FIG. 2). Master security unit 33 comprises two secure communication terminal adapters similar to adapter 130 and each of the adapters stores all of the potential splitting routines. The first of the adapters of master security unit 33 is connected via switching module 4000, time-multiplexed switch 10 and switching module 1000 to terminal adapter 130. The second of the adapters of master security unit 33 is connected via switching module 4000, time-multiplexed switch 10, switching module 5000, switching module 5000', time-multiplexed switch 10' and switching module 1000' to terminal adapter 130'. A first splitting routine is selected for terminal adapter 130 and a second splitting routine is selected for terminal adapter 130'. Master security unit 33 performs a conversion between the two splitting routines to allow the secure call to be completed.

In the secure communication arrangement of FIGS. 2 and 3 as described thus far, the splitting and random number addition operations are performed on the two circuit-switched user terminal B-channels. In two alternative embodiments to be described herein, similar splitting and random number addition operations are performed instead on packets conveyed on the user terminal D-channel. Recall that in central office 100 (FIGS. 4 through 7), a packet-switched call is completed between user terminal 1001 and 4001 using four time-multiplexed switch 10 channels 109 through 112 between input/output port pairs P55 and P61, which channels are reserved for inter-module packet calls between switching modules 1000 and 4000. Such calls are completed from user terminal 1001 via protocol handler 1700-0, protocol handler 1700-1, time-slot interchange unit 1011, time-multiplexed switch 10, time-slot interchange unit 4011, protocol handler 4700-1 and protocol handler 4700-0 to user terminal 4001. In the two alternative embodiments to be described, packet switched calls are established in a similar manner between switching module 1000 of central office 100 and switching module 1000' of central office 100'Four channels on transmission facility 101 and four channels on transmission facility 104 are reserved for packet calls between modules 1000 and 1000'. This packet transport mechanism is only illustrative. The invention applies to arrangements having other packet transport mechanisms between the transmitter and receiver, for example, a separate packet-switched network or an integrated packet-switched and circuit-switched network.

FIRST ALTERNATIVE EMBODIMENT

In the first alternative embodiment, the splitting and random number addition operations are performed on two of the logical channels LCN2 and LCN3 of the D-channel in a way that is directly analogous to that described above with respect to the two B-channels B1 and B2. In this first alternative embodiment, a transmit unit 7131 (FIG. 11) is substituted for the transmit unit 131 of FIG. 2 and a receive unit 7132' (FIG. 12) is substituted for the receive unit 132' of FIG. 3. Of course similar substitutions are made for the receive unit 132 and the transmit unit 131'.

Figure 11:
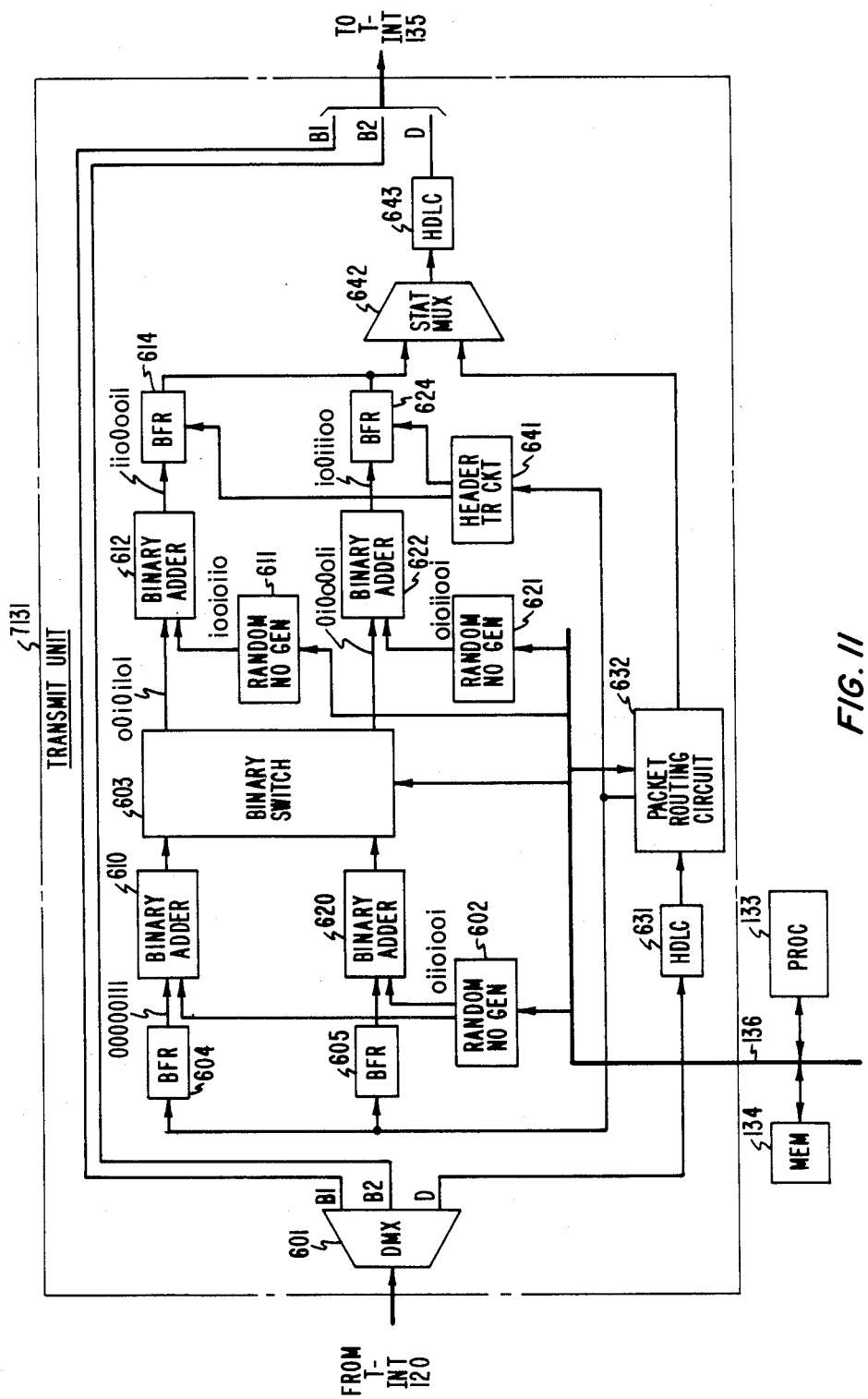
FIG. 11 and FIG. 12 are detailed diagrams of a transmit unit and a receive unit used in a first alternative embodiment of the invention.

Transmit unit 7131 (FIG. 11) includes a demultiplexer 601 which receives the 192-kilobits per second bit stream transmitted by T-interface circuit 120 and extracts therefrom the two 64 kilobits per second B-channels B1 and B2 and the 16 kilobits per second D-channel. In transmit unit 7131, demultiplexer 601 transmits the B-channels B1 and B2 directly on to T-interface circuit 135. The D-channel extracted by demultiplexer 601 is transmitted to an HDLC circuit 631 which terminates the HDLC protocol from user terminal 1002. HDLC circuit 631 extracts packets from received HDLC frames and transmits those packets to a packet routing circuit 632. Packet routing circuit 632 routes packets received in logical channels LCN2 and LCN3 respectively to associated buffers 604 and 605. Packet routing circuit 632 routes other packets, i.e., packets received in logical channels LCN1, LCN4, LCN5 and LCN6 from user terminal 1002 and well as packets received via bus 136 from processor 133 in logical channel LCN7, to a statistical multiplexer 642. However, the packet headers of the packets received in logical channels LCN2 and LCN3 are not transmitted to the buffers 604 and 605 but instead are stored in a header transmit circuit 641 for subsequent use in generating new packet headers to be used after the packets have been reformulated. Once the complete packet information fields have been stored in the buffers 604 and 605 (if both logical channels LCN2 and LCN3 are being used), buffers 604 and 605 begin transmitting the bits of those information fields to binary adders 610 and 620. The splitting and random number addition functions performed in transmit unit 7131 by random number generator 602, binary adders 610 and 620, binary switch 603, random number generators 611 and 621, binary adders 612 and 622 and buffers 614 and 624 are directly analogous to the corresponding functions performed by random number generator 202, binary adders 210 and 220, binary switch 203, random number generators 211 and 221, binary adders 212 and 222, and buffers 214 and 224 in transmit unit 131. The progression of the message 00000111 through transmit unit 7131 is indicated in FIG. 11 for the case when the message 00000111 is contained in the information field of a packet received in logical channel LCN2 and logical channel LCN3 is not being used. As can be seen in FIG. 11 the progression of the message 00000111 in transmit unit 131 directly parallels that of the example described above with respect to FIG. 9. New packet headers are generated by header transmit circuit 641 and inserted ahead of the reformulated packet information fields in the buffers 614 and 624. Such packets are then transmitted in logical channels LCN2 and LCN3 to statistical multiplexer 642, which multiplexes them with the packets received from packet routing circuit 632 in logical channels LCN1, LCN4, LCN5, LCN6 and LCN7, for transmission to an HDLC circuit 643. HDLC circuit 643 inserts the received packets in HDLC frames and transmits such frames on the D-channel to T-interface circuit 135.

Figure 12:
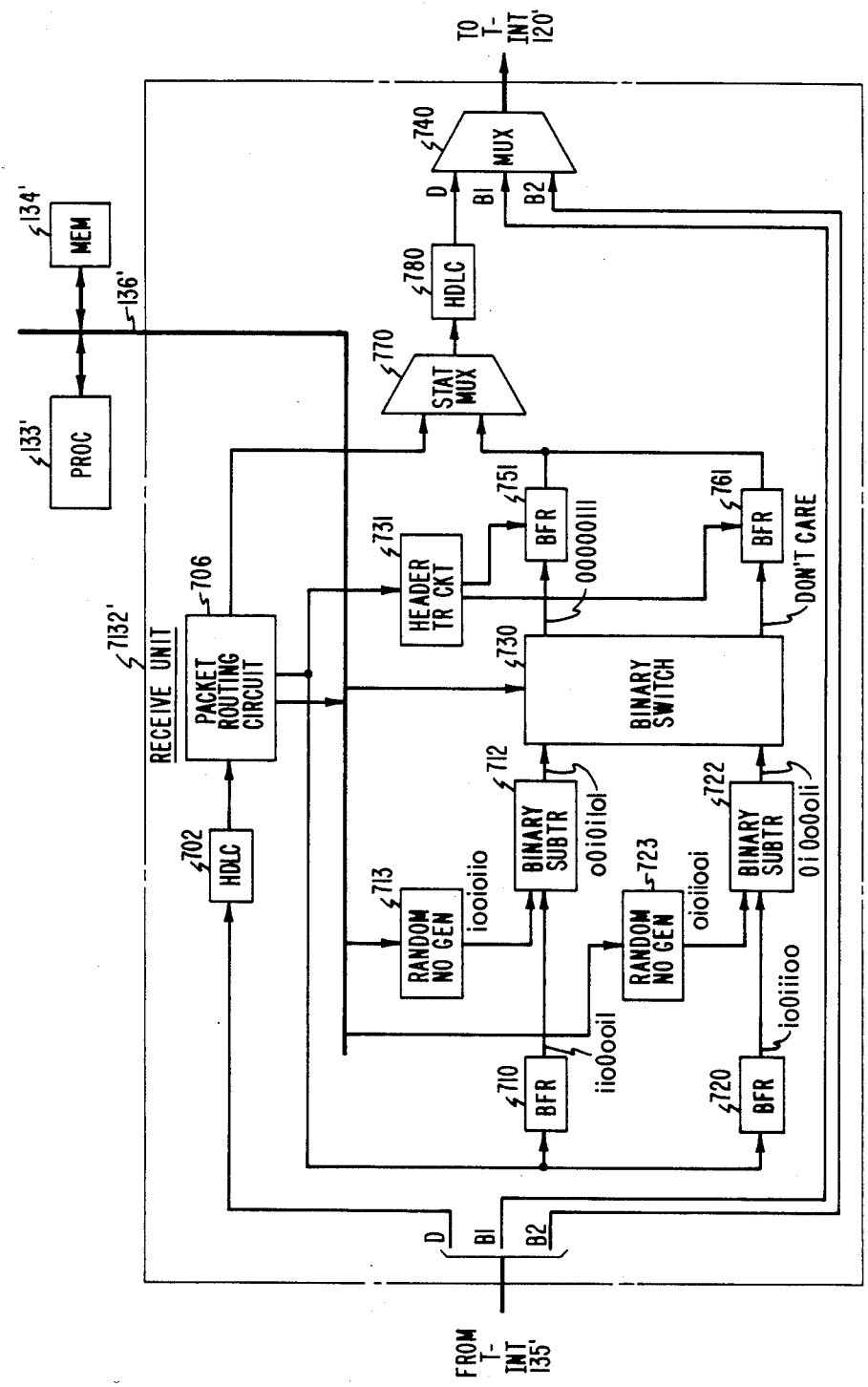

Receive unit 7132' (FIG. 12) performs the inverse of the operation performed by transmit unit 7131. The B-channels B1 and B2 from T-interface circuit 135' are directly transmitted to a multiplexer 740 without modification. The D-channel received from T-interface circuit 135' is transmitted to an HDLC circuit 702 which terminates the HDLC protocol from switching module 1000'. HDLC circuit 702 extract packets from received HDLC frames and transmits those packets to a packet routing circuit 706. Packet routing circuit 706 transmits packets received in logical channels LCN1, LCN4, LCN5 and LCN6 directly on to a statistical multiplexer 770. Packet routing circuit 706 also transmits packets received in logical channel LCN7 to processor 133' via bus 136'. The information fields of packets received in logical channels LCN2 and LCN3 are stored in the associated buffers 710 and 720 and the headers of those packets are stored in a header transmit circuit 731. When the information fields of complete packets have been stored in buffers 710 and 720, buffers 710 and 720 begin transmitting those information fields to the binary subtracters 712 and 722. The random number subtraction and recombining functions performed in receive unit 7132' by random number generators 713 and 723, binary subtracters 712 and 722, and binary switch 730, are directly analogous to similar functions performed by random number generators 313 and 323, binary subtracters 312 and 322, and binary switch 330 in receive unit 132'. The progression of bit streams including the recovery of the message 00000111 in buffer 751 for the continuation of the above-described example is shown in FIG. 12. When complete information fields are stored in the buffers 751 and 752, new packet headers are inserted ahead of such fields by header transmit circuit 731. The complete packets in logical channels LCN2 and LCN3 are transmitted from buffers 751 and 761 respectively to statistical multiplexer 770 which multiplexes those packets with packets received from packet routing circuit 706 in logical channel LCN1, LCN4, LCN5 and LCN6, for transmission to HDLC circuit 780. HDLC circuit 780 inserts received packets in HDLC frames and transmits such frames in the D-channel to multiplexer 740. Multiplexer 740 receives the two B-channels B1 and B2 and the D-channel and inserts such channels into 48-bit line frames for transmission as a 192 kilobits per second bit stream to T-interface circuit 120'.

SECOND ALTERNATIVE EMBODIMENT

In the second alternative embodiment, the splitting and random number addition operations are performed on consecutive packets in a single logical channel rather than on multiple logical channels. In particular the bits of three consecutive packets received in logical channel LCN2 are split among four such packets. The four packets are then separately encrypted using random number addition. In this second alternative embodiment, a transmit unit 8131 (FIG. 13) is substituted for the transmit unit 131 of FIG. 2 and a receive unit 8132' (FIG. 14) is substituted for the receive unit 132' of FIG. 3. Similar substitutions are made for the receive unit 132 and the transmit unit 131'.

Figure 13:
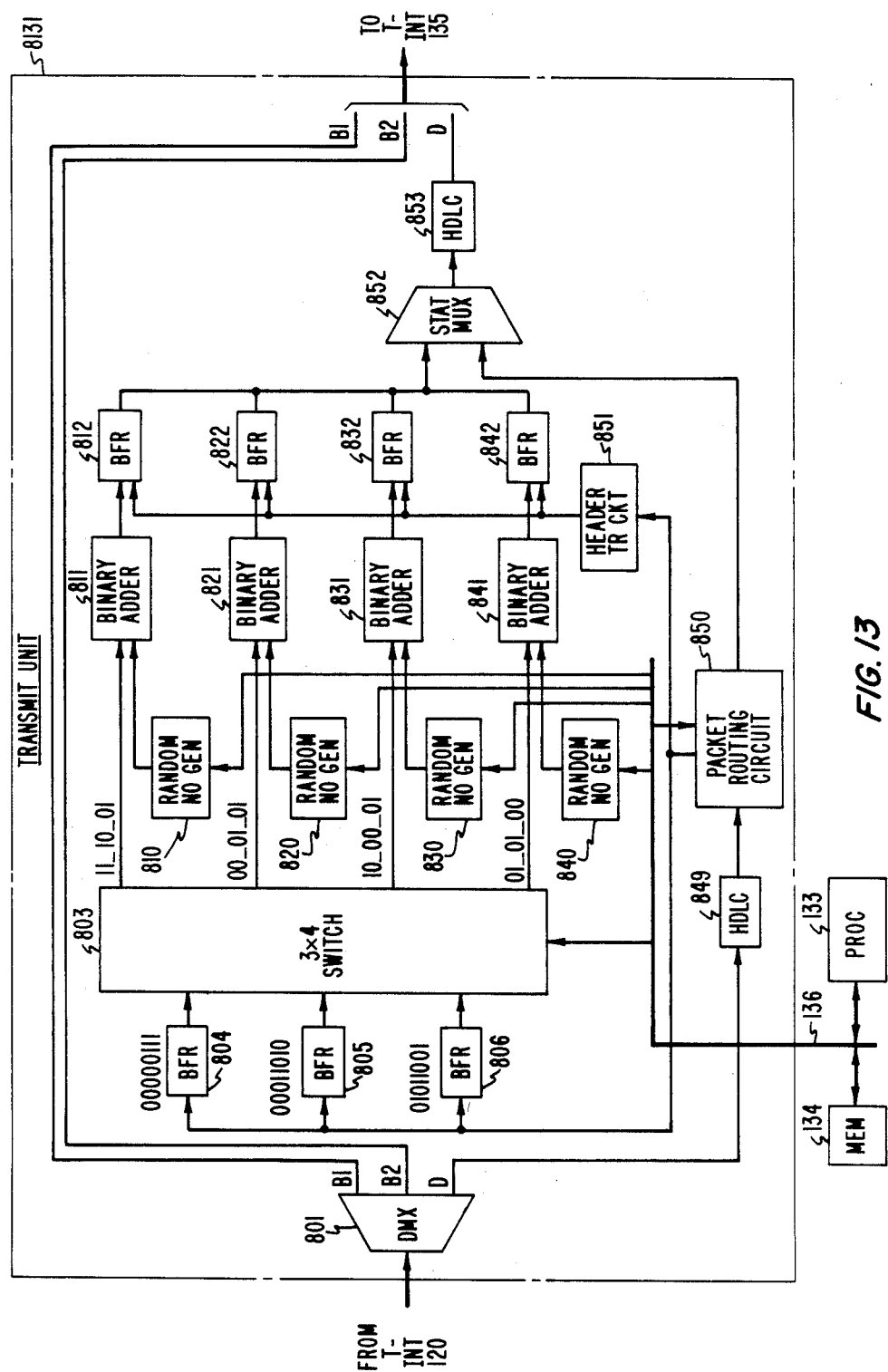
FIG. 13 and FIG. 14 are detailed diagrams of a transmit unit and a receive unit used in a second alternative embodiment of the invention.

Transmit unit 8131 (FIG. 13) includes a demultiplexer 801 that receives the 192 kilobits per second bit stream transmitted by T-interface circuit 120 and extracts therefrom the two 64 kilobits per second B-channels B1 and B2 and the 16 kilobits per second D-channel. Demultiplexer 801 transmits the B-channels B1 and B2 directly to T-interface circuit 135. The D-channel extract demultiplexer 801 is transmitted to an HDLC circuit 849 which terminates the HDLC protocol from user terminal 1002. HDLC circuit 849 extracts packets from received HDLC frames and transmits those packets to a packet routing circuit 850. Packet routing circuit 850 routes packets received in logical channels LCN1 and LCN3 through LCN6 from user terminal 1002 as well as packets received via bus 136 from processor 133 in logical channel LCN7, to a statistical multiplexer 852. Packet routing circuit 850 routes packets received in logical channel LCN2 to three buffers 804, 805, and 806 in a sequential fashion. The first packet received in logical channel LCN2 is transmitted to buffer 804, the second packet is transmitted to buffer 805 and the third packet is transmitted to buffer 806. Only the information fields of the packets are transmitted to buffers 804, 805 and 806. The headers of the packets are stored in a header transmit circuit 851 for subsequent use in generating new packet headers to be used after the packets have been reformulated. Once the complete information fields of the three packets have been stored in the buffers 804, 805 and 806, those fields are transmitted to a 3×4 switch 803 in a sequential manner. Switch 803 is used to connect each of the buffers 804, 805 and 806 to any of four binary adders 811, 821, 831 and 841. As an example, assume that buffers 804, 805 and 806 store the information fields 00000111, 00011010, and 01011001 respectively (FIG. 13). Switch 803 transmits the first 1 of the information field 00000111 from buffer 804 to binary adder 811, transmits the second 1 to binary adder 821, transmits the third 1 to binary adder 831, transmits the first 0 to binary adder 841 and so on until the complete field 00000111 has been transmitted. The binary adders 811, 821, 831 and 841 add the bits received from switch 803 to random bits generated by respective random number generators 810, 820, 830 and 840. After the field 00000111 has been transmitted from buffer 804, buffer 805 transits its field 00011010. However, buffer 805 delays its transmission for such time that each of the random number generators 810, 820, 830 and 840 has time to transmit one additional random bit to the respective binary adders 811, 821, 831 and 841. This time delay is indicated in the bit streams transmitted by switch 803 as shown in FIG. 13 by an underscore (_). After the time delay, switch 803 transmits the first 0 of the information field 00011010 from buffer 805 to binary adder 811, transmits the first 1 to binary adder 821, transmits the second 0 to binary adder 831, etc. Once the transmission of the field 00011010 has been completed, again there is a time delay allowing the transmission of one random bit by the random number generators 810, 820, 830 and 840. After the time delay, the information field 01011001 is sequentially transmitted from buffer 806 in like manner. The sum bit streams generated by binary adders 811, 821, 831 and 841 are stored in respective buffers 812, 822, 832 and 842. New packet headers are generated by header transmit circuit 851 and inserted ahead of the reformulated packet information fields in the buffers 812, 822, 832 and 842. Such packets are then transmitted in logical channel LCN2 to statistical multiplexer 852, which multiplexes them with the packets received from packet routing circuit 850 in logical channels LCN1 and LCN3 through LCN7, for transmission to an HDLC circuit 853. HDLC circuit 853 inserts the received packets in HDLC frames and transmits such frames on the D-channel to T-interface circuit 135.

Figure 14:
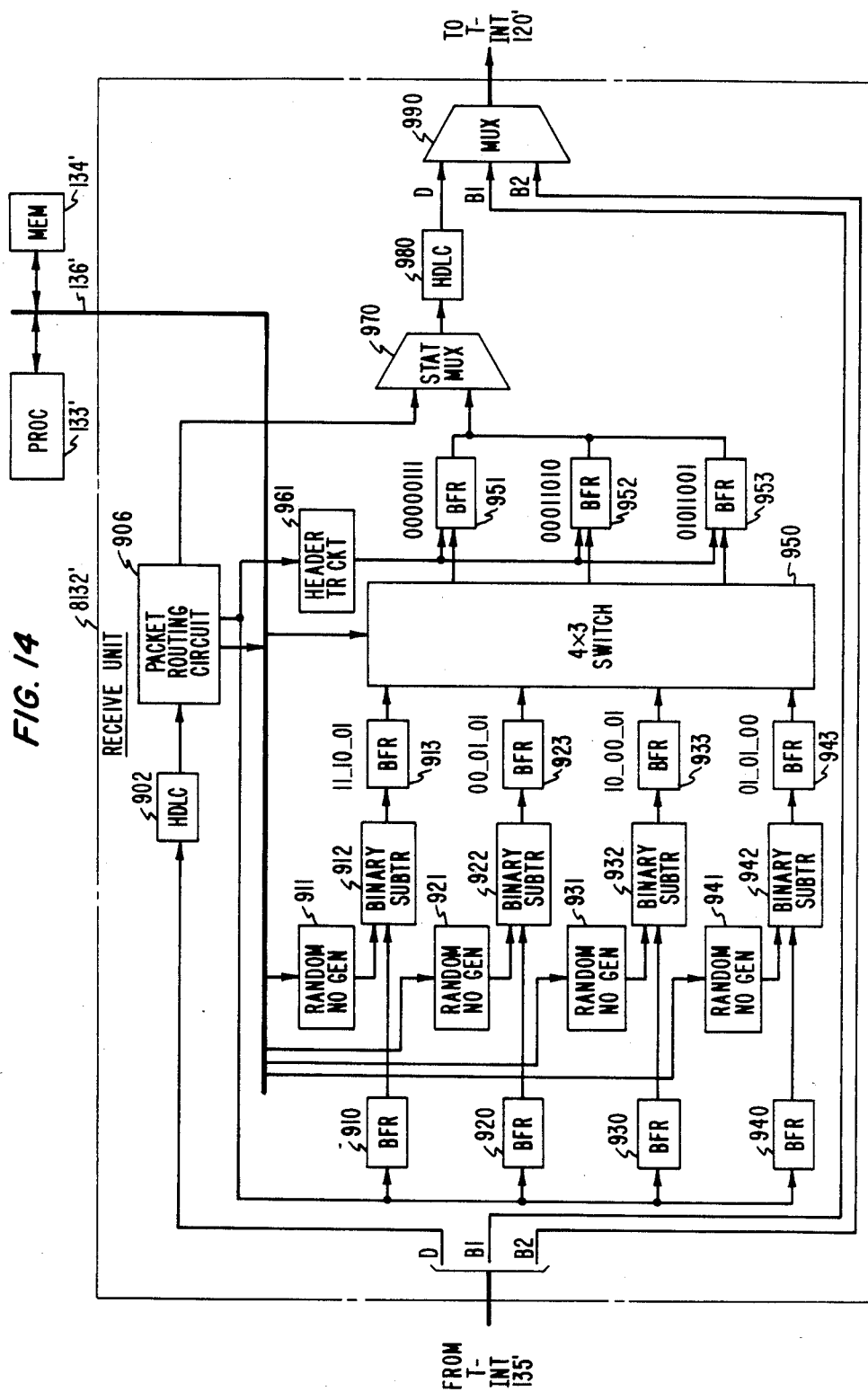

Receive unit 8132' (FIG. 14) performs the inverse of the operation performed by transmit unit 8131. The B-channels B1 and B2 received from T-interface circuit 135' are directly transmitted to a multiplexer 940 without modification. The D-channel received from T-interface circuit 135' is transmitted to an HDLC circuit 902 which terminates the HDLC protocol from switching module 1000'. HDLC circuit 902 extracts packets from received HDLC frames and transmits those packets to a packet routing circuit 906. Packet routing circuit 906 transmits packets received in logical channel LCN1 and LCN3 through LCN6 directly on to a statistical multiplexer 970. Packet routing 906 also transmits packets received in logical channel LCN7 to processor 133' via bus 136'. The information fields of packets received in logical channel LCN2 are stored sequentially in the buffers 910, 920, 930 and 940. The headers of those packets are stored in a header transmit circuit 961. Random number generators 911, 921, 931 and 941 are used to generate the same random bit streams that were generated by the random number generators 810, 820, 830 and 840 in transmit unit 8131. Such random bit streams are then subtracted from the information fields in buffers 910, 920, 930 and 940 by respective binary subtracters 912, 922, 932 and 942. The difference fields generated by the subtracters 912, 922, 932 and 942 are stored in respective buffers 913, 923, 933 and 943. In FIG. 14, the underscore (_) indicates the random bits that were generated during the above-mentioned time delays in transmit unit 8131. The buffers 913, 923, 933 and 943 are enabled in a bitwise sequential fashion to transmit the stored difference fields via a 4×3 switch 950 to the buffers 951, 952 and 953. First, buffer 913 is enabled to transmit the first 1 of its stored difference field 11_1_0_01 to buffer 951, then buffer 923 is enabled to transmit the first one of its stored difference field 00_01_01 to buffer 951, etc. Each buffer 913, 923, 933 and 943 is enabled twice until the original first packet 00000111 is reformed in buffer 951. The random bits indicated by the underscore are deleted and the original second packet 00011010 is reformed in buffer 952 and the original third packet 01011001 is reformed in buffer 953. New packet headers are inserted in the buffers 951 through 953 by header transmit circuit 961 and the complete packets are transmitted in logical channel LCN2 to statistical multiplexer 970. Multiplexer 970 multiplexes those packets with packets received from packet routing circuit 906 in logical channels LCN1 and LCN3 through LCN6 for transmission to HDLC circuit 980. HDLC circuit 980 inserts received packets in HDLC frames and transmits such frames in the D-channel to multiplexer 990. Multiplexer 990 receives the two B-channels B1 and B2 and the D-channel and inserts such channels into 48-bit line frames for transmission as a 192 kilobits per second bit stream to T-interface circuit 120'.

It is to be understood that the above-described embodiments are merely illustrative of the principles of the present invention and that other embodiments may be devised by those skilled in the art without departing from the spirit and scope of the invention. For example, although the splitting in the described embodiments is done on a bit by bit basis, the splitting could also done based on other units, e.g., 4-bit nibbles, 8-bit bytes, 16-bit words, etc. Although the embodiments illustrate the separate encryption of the split channels using a random number addition technique, other encryption techniques such as the DES (Data Encryption Standard) could also be employed. Although the embodiments split information among a specific number of channels or packets, clearly the invention is applicable generally to splitting among any number of channels or packets.

What is claimed is:

1. A security arrangement for communicating an information message comprising
    a plurality of user stations, and
    a digital switching network for selectively establishing communication channels among said plurality of user stations and including control means responsive to a request in a first signalling channel from a first one of said user stations for a secure call to a second one of said user stations both for controlling the establishment by said digital switching network of first and second ones of said communication channels from said first user station through said digital switching network without security processing to said second user station and for selecting a splitting routine from a plurality of message splitting routines said control means being responsive to said selected splitting routine for transmitting in said first signaling channel a first security code signal defining said selected splitting routine to said first user station and transmitting a second security code signal defining a combining routine associated with said selected splitting routine in a second signaling channel to said second user station, said first and second signaling channels each being distinct from said first and second communication channels, said first user station comprising
    means responsive to said first security code signal defining said selected splitting routine, for splitting said message into first portions and second portions in accordance with said selected splitting routine, and
    means for communicating said first portions and said second portions over said first and second communication channels, respectively, through said digital switching network, and said second user station comprising
    means responsive to said second security code signal defining said combining routine and to a receipt of said first portions and second portions from said first and second communication channels, for reforming said message in accordance with said combining routine.

2. A security arrangement in accordance with claim 1 wherein said first and second communication channels are included in separate circuit-switched channels of said digital switching network.

3. A security arrangement in accordance with claim 1 wherein said first and second communication channels are included in separate logical packet-switched channels of said digital switching network.

4. A security arrangement in accordance with claim 1 wherein said first and second communication channels are included in a single logical packet-switched channel of said digital switching network.

5. A security arrangement in accordance with claim 1 wherein said splitting means further comprises
    first memory means for storing control information defining the splitting of messages into portions in accordance with a number of splitting routines,
    first processor means responsive to said first security code signal for reading from said first memory means control information defining the splitting of messages in accordance with said selected splitting routine, and
    means responsive to said control information read from said first memory means, for controlling the splitting of said information message into said first portions and said second portions; and
    wherein said reforming means further comprises
    second memory means for storing control information defining the combining of message portions in accordance with a number of combining routines,
    second processor means responsive to said second security code signal for reading from said second memory means control information defining the combining of message portions in accordance with said combining routine,
    means responsive to said control information read from said second memory means, for combining said first portions and said second portions to reform said information message.

6. A security arrangement in accordance with claim 5 wherein said communicating means comprises
    means for separately encrypting said first portions and said second portions and
    means for transmitting said encrypted first portions and said encrypted second portions over said first and second communication channels, respective, through said digital switching network; and
    wherein said combining means comprises
    means for separately decrypting said first portions and said second portions and means for combining said decrypted first portions and said decrypted second portions to reform said information message.

7. A security arrangement in accordance with claim 6 wherein said means for separately encrypting said first portions and said second portions comprises means for combining first and second random data with said first portions and said second portions, respectively, and wherein said means for separately decrypting said first portions and said second portions comprises means for removing said first and second random data from said first portions and said second portions, respectively.

8. A security arrangement in accordance with claim 6 further comprising means for transmitting a special character on both of said first and second communication channels, and means responsive to a receipt of said special character on both of said first and second communication channels, for enabling said reforming means.

9. A security arrangement in accordance with claim 6 wherein said communicating means is responsive to the initiation by said splitting means of the splitting of said information message into said first portions and said second portions, for transmitting a first character on said first communication channel before transmitting said first portions, and for transmitting a second character on said second channel before transmitting said second communication portions, where said first and second characters may be identical characters, and wherein said combining means is responsive to a receipt of said first character on said first communication channel and said second communication character on said second channel, for initiating the decrypting and combining of said first portions and said second portions.

10. A security arrangement in accordance with claim 6 wherein said network comprises a circuit switching network, wherein said first and second communication channels comprise first and second circuit-switched channels of said circuit switching network.

11. A security arrangement in accordance with claim 10 wherein said first and second circuit-switched channels of said circuit switching network, are transmitted along, physically separate paths.

12. A security arrangement in accordance with claim 6 wherein said network comprises packet transport means, wherein said first and second communication channels comprise first and second logical channels through said packet transport means.

13. A security arrangement in accordance with claim 12 wherein said first and second logical channels are transmitted through said packet transport means along physically separate paths.

14. A security arrangement in accordance with claim 1 wherein said message comprises a plurality of bits and wherein each of said first portions and each of said second portions include at least one of said bits.

15. An arrangement in accordance with claim 1 wherein said communicating means comprises means for separately encrypting said first portions and said second portions and means for transmitting said encrypted first portions and said encrypted second portions over said first and second communication channels, respectively, through said digital switching network; and wherein said reforming means comprises means for separately decrypting said first portions and said second portions and means for combining said decrypted first portions and said decrypted second portions to reform said message.

16. A security arrangement in accordance with claim 15 wherein said means for separately encrypting said first portions and said second portions comprises means for combining first and second random data with said first portions and said second portions, respectively, and wherein said means for separately decrypting said first portions and said second portions comprises means for removing said first and second random data from said first portions and said second portions, respectively.

17. A security arrangement in accordance with claim 1 further comprising means for transmitting a special character on both of said first and second communication channels, and means responsive to a receipt of said special character on both of said first and second communication channels, for enabling said reforming means.

18. A security arrangement in accordance with claim 1 wherein said communicating means is responsive to the initiation by said splitting means of the splitting of said information message into said first portions and said second portions, for transmitting a first character on said first communication channel before transmitting said first portions, and for transmitting a second character on said second communication channel before transmitting said second portions, where said first and second characters may be identical characters, and wherein said reforming means is responsive to a receipt of said first character on said first communication channel and said second character on said second communication channel, for initiating the reforming of said information message.

19. A security arrangement in accordance with claim 1 wherein said network comprises a circuit switching network, wherein said first and second communication channels comprise first and second circuit-switched channels of said circuit switching network.

20. A security arrangement in accordance with claim 19 wherein said first and second circuit-switched channels of said circuit switching network, are transmitted along physically separate paths.

21. A security arrangement in accordance with claim 1 wherein said network comprises packet transport means, wherein said first and second channels comprise first and second logical channels through said packet transport means.

22. A security arrangement in accordance with claim 21 wherein said first and second logical channels are transmitted through said packet transport means along physically separate paths.

23. A security arrangement for communicating a message comprising a plurality of user stations, and a digital switching network for selectively establishing communication channels among said plurality of user stations and including control means responsive to a request in a first signaling channel from a first one of said user stations for a secure call to a second one of said user stations both for controlling the establishment by said digital switching network of N of said communication channels from said first user station through said digital switching network without security processing to said second user station, N being a positive integer greater than one, and for selecting a splitting routine from a plurality of message splitting routines, said control means being responsive to said selected splitting routine for transmitting in said first signaling channel a first security code signal defining said selected splitting routine to said first user station and transmitting a second security code signal defining a combining routine associated with said selected splitting routine in a second signaling channel to said second user station, said first and second signaling channels each being distinct from said N communication channels, said first user station comprising means responsive to said first security code signal defining said selected splitting routine, for splitting said message into N components in accordance with said selected splitting routine, and means for transmitting each of said N components on an associated one of said N communication channels through said digital switching network, and said second user station comprising means responsive to said second security code signal defining said combining routine and to a receipt of said N components on said N communication channels, for combining said N components in accordance with said combining routine to reform said message.

24. A security arrangement in accordance with claim 23 wherein said splitting means further comprises first memory means for storing control information defining the splitting of messages into components in accordance with a number of splitting routines, first processor means responsive to said first security code signal for reading from said first memory means control information defining the splitting of messages in accordance with said selected splitting routine, and means responsive to said control information read from said first memory means, for controlling the splitting of said message into said N components; and wherein said combining means further comprises second memory means for storing control information defining the combining of message components in accordance with a number of combining routines, second processor means responsive to said second security code signal for reading from said second memory means control information defining the combining of message components in accordance with said combining routine associated with said selected splitting routine, and means responsive to said control information read from said second memory means for controlling the combining of said N components to reform said message.

25. A security arrangement in accordance with claim 24 wherein said means for transmitting each of said N components comprises means for separately encrypting each of said N components and means for transmitting each of said N encrypted components on an associated one of said N communication channels; and wherein said combining means comprises means for separately decrypting each of said N received components and means for combining said N decrypted components to reform said message.

26. A security arrangement for communicating the information in N packets, N being a positive integer, said arrangement comprising a plurality of user stations, and a digital switching network for selectively establishing communication channels among said plurality of user stations and including control means responsive to a request in a first signaling channel from a first one of said stations for a secure call to a second one of said user stations both for controlling the establishment by said digital switching network of at least one of said communication channels from said first user station through said digital switching network without security processing to said second user station and for selecting a splitting routine from a plurality of packet splitting routines, said control means being responsive to said selected splitting routine for transmitting in said first signaling channel a first security code signal defining said selected splitting routine to said first user station and transmitting a second security code signal defining a combining routine associated with said selected splitting routine in a second signaling channel to said second user station, said first and second signaling channels each being distinct from said at least one communication channel, said first user station comprising means responsive to said first security code signal defining said selected splitting routine, for splitting each of said N packets among M packets in accordance with said selected splitting routine, M being a positive integer greater than one, and means for transmitting said M packets on said at least one communication channel through said digital switching network, and said second user station comprising means responsive to said second security code signal defining said combining routine and to a receipt of said M packets on said at least one communication channel, for combining information from each of said M received packets in accordance with said combining routine to reform each of said N packets.

27. A security arrangement in accordance with claim 26 wherein said splitting means further comprises first memory means for storing control information defining the splitting of individual packets among multiple packets in accordance with a number of packet splitting routines, first processor means responsive to said first security code signal for reading from said first memory means control information defining the splitting of packets in accordance with said selected splitting routine, and means responsive to said control information read from said first memory means, for controlling the splitting of each of said N packets among said M packets; and wherein said combining means further comprises second memory means for storing control information defining the combining of information from multiple packets into individual packets in accordance with a number of combining routines, second processor means responsive to said second security code signal for reading from said second memory means control information defining the combining of information from multiple packets in accordance with said combining routine associated with said selected splitting routine, and means responsive to said control information read from said second memory means for controlling the combining of said information from each of said M packets to reform each of said N packets.

28. A security arrangement in accordance with claim 27 wherein said means for transmitting said M packets comprises means for separately encrypting each of said M packets and means for transmitting said M encrypted packets on said at least one communication channel; and wherein said combining means comprises means for separately decrypting each of said M received packets and means for combining information from said M decrypted packets, to reform each of said N packets.

29. In a switching arrangement for providing switched connections among a plurality of user stations each having a plurality of channels contemporaneously available for communication, a security method of communication a message from an originating one of said user stations to a terminating one of said stations comprising transmitting, by said originating user station, a request to said switching arrangement for a secure call from said originating user to said terminating user stations, providing, by said switching arrangement in response to said request, a first connection without security processing between a first one of said channels of said originating user station and a first one of said channels of said terminating user station, providing, by said switching arrangement in response to said request, a second connection without security processing between a second one of said channels of said originating user station and a second one of said channels of said terminating user station, selecting, by said switching arrangement in response to said request, a splitting routine from a plurality of message splitting routines, transmitting, by said switching arrangement, a first security code signal defining said selected splitting routine to said originating user station, transmitting, by said switching arrangement, a second security code signal defining a combining routine associated with said selected splitting routine to said terminating user station, splitting by said originating user station in response to said first security code signal, said message into first portions and second portions in accordance with said selected splitting routine, separately encrypting, by said originating user station, said first portions and said second portions, transmitting, by said originating user station in its first channel, said encrypted first portions to said first connection, transmitting, by said originating user station in its second channel, said encrypted second portions to said second connection, receiving, by said terminating user station in its first channel, said encrypted first portions from said first connection, receiving, by said terminating user station in its second channel, said encrypted second portions from said second connection, separately decrypting, by said terminating user station, said received encrypted first portions and said received encrypted second portions and combining, by said terminating user station in response to said second security code signal, said decrypted first portions and said decrypted second portions in accordance with said combining routine to reform said message.

30. In an arrangement comprising a first switch serving a first user station, a first plurality of user channels between said first user station and said first switch, a second switch serving a second user station and a second plurality of user channels between said second user station and said second switch, a security method of communicating a message from said first user station to said second user station, said first user station transmitting a call request in a given one of said first plurality of channels to said first switch, said call request defining a secure call to said second user station, said first switch transmitting said call request to said second switch, a given one of said first and second switches selecting one of a plurality of message splitting routines for splitting said message among predetermined ones of said first plurality of channels each being distinct from said given one of said first plurality of channels, said given switch transmitting a definition of said selected splitting routine to the other one of said first and second switches, said first switch transmitting said definition of said selected splitting routine in said given one of said first plurality of channels to said first user station, said second switch transmitting said definition of said selected splitting routine in a given one of said second plurality of channels to said second user station, said first and second switches connecting without security processing of information from said predetermined ones of said first plurality of channels to corresponding ones of said second plurality of channels each being distinct from said given one of said second plurality of channels, said first user station transmitting said message on said predetermined ones of said first plurality of channels in accordance with said selected splitting routine, and said second user station combining information received on said corresponding ones of said second plurality of channels in accordance with a combining routine that is the inverse of said selected splitting routine.

31. In an arrangement comprising a plurality of user stations, an integrated services digital network for providing digital connections among said user stations, and a plurality of user access lines each connecting an associated one of said user stations with said network, each of said user access lines having at least first and second B-channels and a D-channel thereon, said D-channel being distinct from said first and second B-channels,
a security method of communicating a message from a first one of said user stations having an associated first user access line, to a second one of said user stations having an associated second user access line, said method comprising
said first user station transmitting in the D-channel of said first user access line, a secure call request to said network, said secure call request defining a secure call to said second user station,
said network selecting, in response to said secure call request, one of a plurality of message splitting routines for splitting said message between the first and second B-channels of said first user access line,
said network providing a circuit-switched connection without security processing from said first B-channel of said first user access line to the first B-channel of said second user access line, and providing a circuit-switched connection without security processing from said second B-channel of said first user access line to the second B-channel of said second user access line,
said network transmitting a definition of said selected splitting routine to said first user station in said D-channel of said first user access line, and to said second user station in the D-channel of said second user access line,
said first user station transmitting said message in said first and second B-channels of said first user access line in accordance with said selected splitting routine and
said second user station combining information received in said first and second B-channels of said second user access line in accordance with a combining routine that is the inverse of said selected splitting routine.

32. In an arrangement comprising a plurality of user stations, an integrated services digital network for providing digital connections among said use stations, and a plurality of user access lines each connecting an associated one of said user stations with said network, each of said user access lines having at least a D-channel thereon, said D-channel including a signaling channel and a plurality of logical data channels, said signaling channel being distinct from said logical data channels,
a security method of communicating a message from a first one of said user stations having an associated first user access line, to a second one of said user stations having an associated second user access line, said method comprising
said first user station transmitting in the signaling channel of said first user access line, a secure call request to said network, said secure call request defining a secure call to said second user station,
said network selecting, in response to said secure call request, one of a plurality of message splitting routines for splitting said message among logical data channels of said first user access line,
said network providing packet-switched connections without security processing from said logical data channels of said first user access line to logical data channels of said second use access line,
said network transmitting a definition of said selected splitting routine to said first user station in said signaling channel of said first user access line, and to said second user station in the signaling channel of said second user access line,
said first user station transmitting said message in said logical data channels of said first user access line in accordance with said selected splitting routine and
said second user station combining information received in said logical data channels of said second user access line in accordance with a combining routine that is the inverse of said selected splitting routine.

33. In an arrangement comprising a plurality of user stations, an integrated service digital network for providing digital connections among said user stations, and a plurality of user access lines each connecting an associated one of said user stations with said network, each of said user access lines having at least a D-channel thereon, said D-channel including a signaling channel and at least one logical data channel, said signaling channel being distinct from said logical data channel,
a security method of communicating a message from a first one of said user stations having an associated first user access line, to a second one of said user stations having an associated second user access line, said method comprising
said first user station transmitting in the signaling channel of said first user access line, a secure call request to said network, said secure call request defining a secure call to said second user station,
said network selecting, in response to said secure call request, one of a plurality of message splitting routines for splitting said message among a plurality of packets to be transmitted in a logical data channel of said first user access line,
said network providing a packet-switched connection without security processing from said logical data channel of said first user access line to a logical data channel of said second user access line,
said network transmitting a definition of said selected splitting routine to said first user station in said signaling channel of said first user access line, and to said second user station in the signaling channel of said second user access line,
said first user station transmitting said message in said plurality of packets in said logical data channel of said first user access line in accordance with said selected splitting routine and
said second user station combining information received in said plurality of packets in said logical data channel of said second user access line in accordance with a combining routine that is the inverse of said selected splitting routine.

34. Apparatus for secure communication of messages between different ones of a plurality of user stations interconnected via a switching arrangement wherein said switching arrangement comprises
means responsive to a request in a first signaling channel from a first one of said stations for a secure call to a second one of said stations for establishing first and second communication channels without security processing through said switching arrangement between said first and second stations, said first signaling channel being distinct from said first and second communication channels, means responsive to said request for selecting one of plurality of message splitting routines, means for storing data defining, for each of said plurality of stations, security code signals defining to said each station said plurality of splitting routines, means responsive to said request and said selection, for reading said stored data to determine a first security code signal defining said selected splitting routine to said first station and a second security code signal defining a combining routine associated with said selected splitting routine to said second station, means for transmitting said first security code signal in said first signaling channel to said first station and means for transmitting said second security code signal in a second signaling channel to said second station, said second signaling channel being distinct from said first and second communication channels, wherein said first station comprises means responsive to said first security code signal for splitting a message into first portions and second portions in accordance with said selected splitting routine and means for transmitting said first portions and said second portions over said first and second communication channels, respectively, and wherein said second station comprises means responsive to said second security code signal and to a receipt of said first and second portions from said first and second communication channels, for reforming said message in accordance with said combining routine associated with said selected splitting routine.

* * * * *

UNITED STATES PATENT AND TRADEMARK OFFICE
CERTIFICATE OF CORRECTION

PATENT NO. : 4,802,220

DATED : January 31, 1989

INVENTOR(S) : Walter S. Marker, Jr.

It is certified that error appears in the above-identified patent and that said Letters Patent is hereby corrected as shown below:

<u>IN THE CLAIMS</u>

Column 23, line 59, after "routines" insert a comma;
Column 24, line 64, "respective" should be "respectively";
Column 25, line 29, "second channel" should be "second communication channel",
Column 25, line 30, delete "communication",
Column 25, line 35, delete "communication",
Column 25, line 36, "second channel" should be "second communication channel";
Column 26, line 60, "second channels" should be "second communication channels";
Column 28, line 25, "said stations" should be "said user stations";
Column 29, lines 39 and 40, "communication" should be "communicating",
Column 29, line 46, after "user" insert --station--,
Column 29, line 47, "stations" should be "station";
Column 30, line 1, after "splitting" insert a comma;
Column 31, line 51, "use" should be "user";
Column 32, line 6, "use" should be "user",
Column 32, line 21, "service" should be "services";
Column 33, line 6, before "plurality" insert --a--.

Signed and Sealed this

Tenth Day of July, 1990

Attest:

HARRY F. MANBECK, JR.

*Attesting Officer*     *Commissioner of Patents and Trademarks*